(12) United States Patent
Nagasoe et al.

(10) Patent No.: US 7,243,189 B2
(45) Date of Patent: Jul. 10, 2007

(54) DATA PROCESSING SYSTEM AND METHOD

(75) Inventors: Yasuyuki Nagasoe, Odawara (JP);
Shunji Kawamura, Yokohama (JP);
Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 11/070,885

(22) Filed: Mar. 3, 2005

(65) Prior Publication Data
US 2006/0155939 A1    Jul. 13, 2006

(30) Foreign Application Priority Data
Dec. 24, 2004    (JP)    ............................... 2004-373285

(51) Int. Cl.
*G06F 12/00*    (2006.01)
(52) U.S. Cl. ...................... 711/112; 711/111; 711/114; 711/145; 711/152; 711/161; 711/163; 707/204
(58) Field of Classification Search ................ 711/112, 711/111, 114, 145, 152, 161, 163; 707/204
See application file for complete search history.

(56) References Cited

U.S. PATENT DOCUMENTS 5,241,668 A * 8/1993 Eastridge et al. ............. 714/5
5,933,824 A * 8/1999 DeKoning et al. ............. 707/8
6,145,067 A * 11/2000 Kuwata ....................... 711/165
RE37,038 E * 1/2001 Eastridge et al. ............... 714/5
6,219,726 B1 * 4/2001 Ripberger ..................... 710/36
6,738,877 B1 * 5/2004 Yamakawa et al. ......... 711/164
6,772,288 B1 * 8/2004 Flake et al. ................. 711/118
2005/0262317 A1 * 11/2005 Nakanishi et al. .......... 711/162
2006/0053250 A1 * 3/2006 Saze .......................... 711/114

FOREIGN PATENT DOCUMENTS

JP    2000-112822    4/2000

* cited by examiner

*Primary Examiner*—Stephen C. Elmore
(74) *Attorney, Agent, or Firm*—Mattingly, Stanger, Malur & Brundidge, P.C.

(57) ABSTRACT

An access control attribute that can be established for an extent that is provided in a storage device may be any access control attribute signifying write permission, read permission, and write prohibition, but an access control attribute signifying read prohibition is not supported. In cases where a read request for read target data is received from a communication device that transmits the read request, the data processing system reads read target data from a read source extent without retrieving an access control attribute of the read source extent according to the read request from among a plurality of access control attributes.

15 Claims, 21 Drawing Sheets

FIG. 4A

EXTENT MANAGEMENT INFORMATION 306

| ITEM | CONTENT |
|---|---|
| EXTENT ID | EXTENT IDENTIFIER |
| ACCESS CONTROL ATTRIBUTE INFORMATION | STATUS FLAG INDICATING ATTRIBUTE ASSIGNED TO EXTENT<br>• WRITE PROHIBITION<br>• READ PROHIBITION |
| LEADING EXTERNAL LBA | LEADING EXTERNAL LBA OF EXTENT |
| EXTENT LENGTH | SIZE OF EXTENT |
| CONTINUOUS PERIOD SETTING DATE AND TIME | • DATE AND TIME AT WHICH WRITE PROHIBITION FLAG OF EXTENT IS VALIDATED<br>• DATA AND TIME AT WHICH READ PROHIBITION FLAG OF EXTENT IS VALIDATED |
| CONTINUOUS PERIOD | • PERIOD IN WHICH INVALIDATION OF WRITE PROHIBITION ATTRIBUTE IS PROHIBITED (VALUE OF INPUT TIME)<br>• PERIOD IN WHICH INVALIDATION OF READ PROHIBITION ATTRIBUTE IS PROHIBITED (VALUE OF INPUT TIME) |
| EXTENT POINTER | EXTENT ID WHEN NEXT EXTENT EXISTS IN MANAGEMENT BLOCK |

FIG. 4B

| ACCESS CONTROL ATTRIBUTE | WRITE PROHIBITION FLAG | READ PROHIBITION FLAG | ACCESS CONTROL ACTION |
|---|---|---|---|
| READ/WRITABLE | 0 | 0 | READ/WRITABLE |
| READ ONLY | 1 | 0 | READABLE, WRITE PROHIBITION |
| WRITE ONLY | 0 | 1 | WRITABLE, READ PROHIBITION |
| NOT READ/WRITABLE | 1 | 1 | READ/WRITE PROHIBITION |

FIG. 5
LDEV COMMON INFORMATION 303

| ITEM | CONTENT |
|---|---|
| VMA IDENTIFIER | INFORMATION FOR UNIQUELY IDENTIFYING VMA |
| EXTENT EXISTENCE | WHETHER ONE OR MORE EXTENTS ARE INCLUDED |
| EXISTENCE OF WRITE PROHIBITION EXTENT | WHETHER ONE OR MORE EXTENTS FOR WHICH AN ACCESS CONTROL ATTRIBUTE RELATING TO WRITE PROHIBITION IS ESTABLISHED ARE INCLUDED |
| EXISTENCE OF READ PROHIBITION EXTENT | WHETHER ONE OR MORE EXTENTS FOR WHICH AN ACCESS CONTROL ATTRIBUTE RELATING TO READ PROHIBITION IS ESTABLISHED ARE INCLUDED |
| EXTENT ID BITMAP | WHETHER AN EXTENT ID IS EMPLOYED |
| MANAGEMENT BLOCK INFORMATION BITMAP | • FLAG INDICATING WHETHER A MANAGEMENT BLOCK INCLUDES AN EXTENT<br>• FLAG INDICATING WHETHER A MANAGEMENT BLOCK INCLUDES THE EDGE OF THE EXTENT<br>• FLAG INDICATING WHETHER A MANAGEMENT BLOCK INCLUDES A WRITE PROHIBITION AREA<br>• FLAG INDICATING WHETHER A MANAGEMENT BLOCK INCLUDES A READ PROHIBITION AREA |
| EXTENT POINTER | POINTER TO LEADING EXTENT IN MANAGEMENT BLOCK (EXTENT ID) |

FIG. 6A
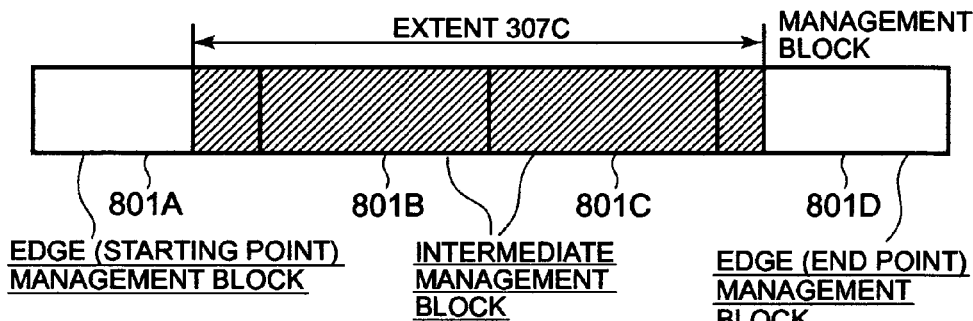

FIG. 6B
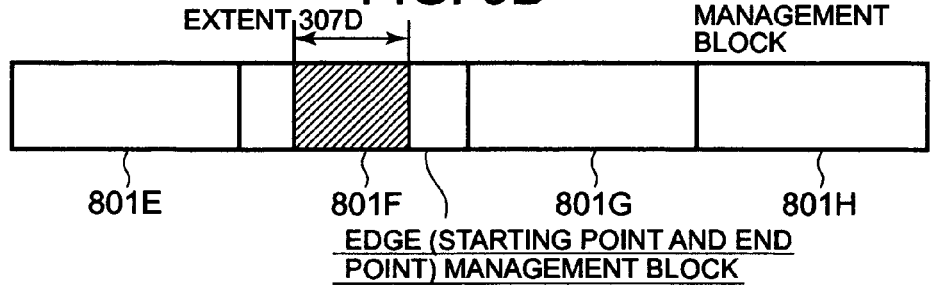

FIG. 6C

| | STATUS FLAG 901 | | | | JUDGMENT OF PROCESSING FEASIBILITY 902 | | | |
|---|---|---|---|---|---|---|---|---|
| | CONTAINS EXTENT 903 | CONTAINS END POINT 904 | CONTAINS WRITE PROHIBITION AREA 905 | CONTAINS READ PROHIBITION AREA 906 | EXTENT NEW CREATION 907 | | WRITING 910 | READING 911 |
| | | | | | EDGE MANAGEMENT BLOCK 908 | INTERMEDIATE MANAGEMENT BLOCK 909 | | |
| 921 | 1 | 0 | 0 | 0 | NG | NG | OK | OK |
| 922 | 1 | 1 | 0 | 0 | DETAILED JUDGMENT | NG | OK | OK |
| 923 | 1 | 1 | 1 | 0 | DETAILED JUDGMENT | NG | DETAILED JUDGMENT | OK |
| 924 | 1 | 0 | 1 | 0 | NG | NG | NG | OK |
| 925 | 0 | 0 | 0 | 0 | OK | OK | OK | OK |
| 926 | 0 | 1 | 0 | 0 | COMBINATION DOES NOT EXIST | | | |
| 927 | 0 | 1 | 1 | 0 | COMBINATION DOES NOT EXIST | | | |
| 928 | 0 | 0 | 1 | 0 | COMBINATION DOES NOT EXIST | | | |
| 929 | 1 | 0 | 0 | 1 | NG | NG | OK | NG |
| 930 | 1 | 1 | 0 | 1 | DETAILED JUDGMENT | NG | OK | DETAILED JUDGMENT |
| 931 | 1 | 1 | 1 | 1 | DETAILED JUDGMENT | NG | DETAILED JUDGMENT | DETAILED JUDGMENT |
| 932 | 1 | 0 | 1 | 1 | NG | NG | NG | NG |
| 933 | 0 | 0 | 0 | 1 | COMBINATION DOES NOT EXIST | | | |
| 934 | 0 | 1 | 0 | 1 | COMBINATION DOES NOT EXIST | | | |
| 935 | 0 | 1 | 1 | 1 | COMBINATION DOES NOT EXIST | | | |
| 936 | 0 | 0 | 1 | 1 | COMBINATION DOES NOT EXIST | | | |

FIG. 9

| LDEV NUMBER | EXISTENCE OF VMA | EXISTENCE OF WRITE PROHIBITION EXTENT |
|---|---|---|
| 1 | YES | YES |
| 2 | YES | NO |
| ⋮ | ⋮ | ⋮ |

FIG. 14A

| DISPLAY OF LDEV COMMON INFORMATION OF ALL LDEV | | | | | |
|---|---|---|---|---|---|
| LDEV NUMBER | VMA TYPE | TOTAL CAPACITY | VMA CAPACITY | EXISTENCE OF EXTENT | ----- |
| 00 | ARCHIVE | 50GB | 10GB | YES | ----- |
| 01 | - | 0.8GB | 0.4GB | NO | ----- |
| 02 | - | 32GB | 10GB | NO | ----- |
| ⋮ | ⋮ | ⋮ | ⋮ | ⋮ | ⋮ |

FIG. 14B

DISPLAY OF ALL EXTENT MANAGEMENT INFORMATION IN LDEV OF LDEV NUMBER [ 01 ▼ ]

| EXTENT ID | ACCESS CONTROL ATTRIBUTE | EXTERNAL LBA | EXTENT LENGTH | DATA PROTECTION PERIOD | ----- |
|---|---|---|---|---|---|
| 00 | READ/ WRITABLE | 32 | 32MB | - | ----- |
| 01 | READ ONLY | 223 | 1MB | 1000 DAYS (UNTIL OCTOBER 1, 2006) | ----- |
| 02 | READ/ WRITABLE | 512 | 128MB | 1000 DAYS (UNTIL FEBRUARY 24, 2005) | ----- |
| ⋮ | ⋮ | ⋮ | ⋮ | ⋮ | ⋮ |

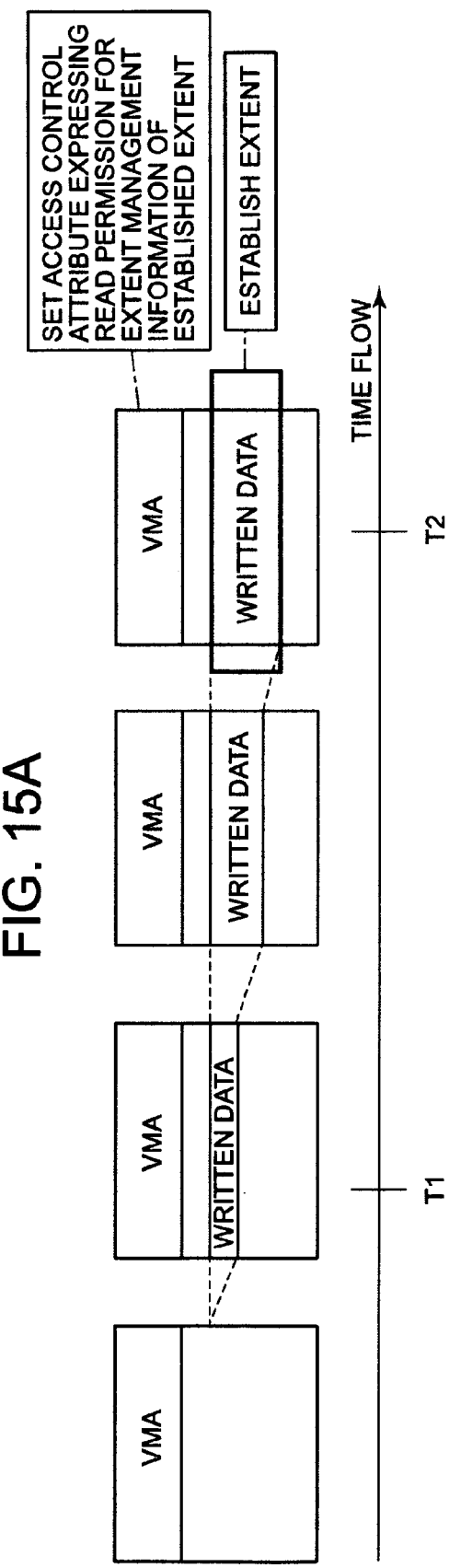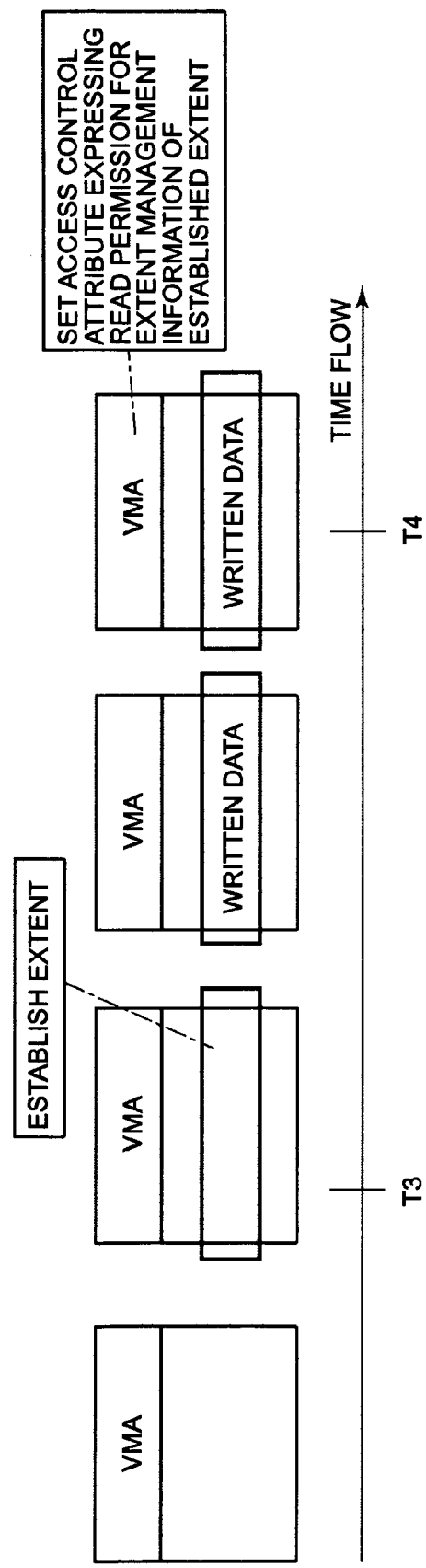

FIG. 18A
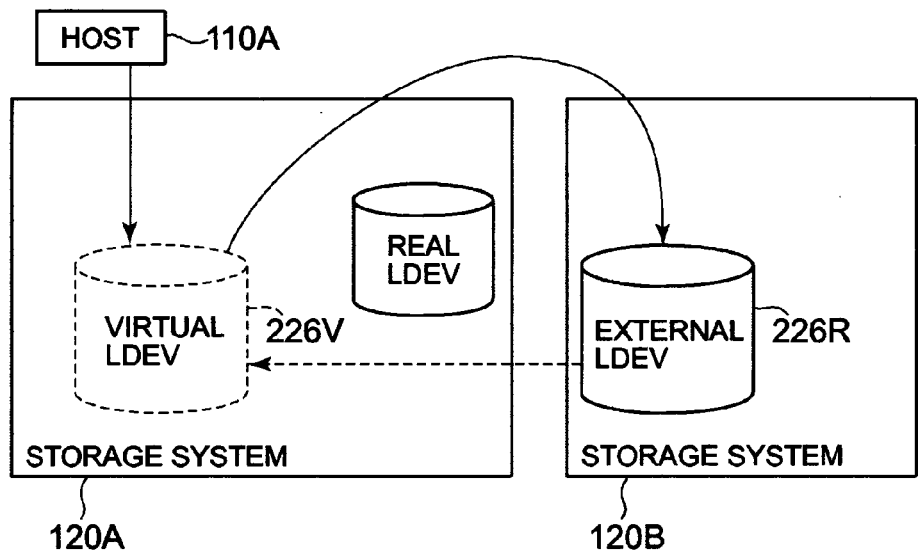
FIG. 18B
| VMA IDENTIFIER | VMA TYPE |
|---|---|
| 0123456789ABCDEF | DIGITAL ARCHIVE |
| FEDCBA9876543210 | FUNCTION A |
FIG. 18C
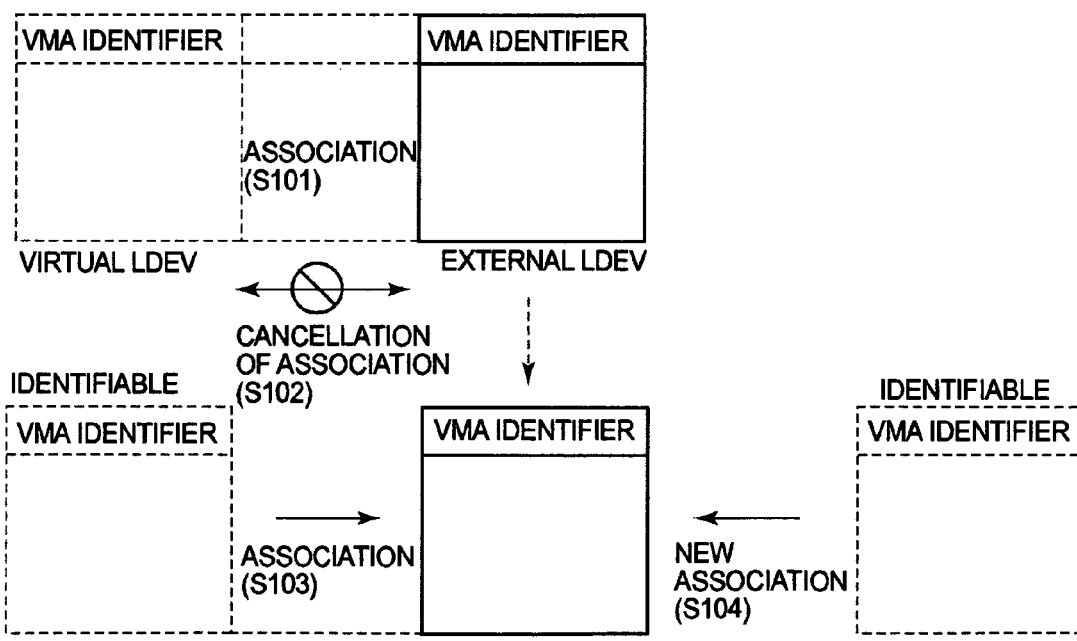

DATA PROCESSING SYSTEM AND METHOD

CROSS-REFERENCE TO PRIOR APPLICATION

This application relates to and claims priority from Japanese Patent Application No. 2004-373285, filed on Dec. 24, 2004 the entire disclosure of which is incorporated herein by reference.

BACKGROUND OF THE INVENTION

1. Field of the Invention

The present invention relates to a computer technology for processing data.

2. Description of the Related Art

Storage systems comprising a plurality of physical storage devices (disk drives, for example) are known. A plurality of physical storage devices can store a plurality of logical storage devices (also known as 'logical volumes' or 'logical units') A storage system can communicate with a host computer and comprise a cache memory and a control memory (also called a 'shared memory'), for example. A cache memory is a memory for temporarily storing data that is exchanged between a host computer and a logical storage device ('Logical Device' is abbreviated and written as 'LDEV' hereinbelow) and a control memory is a memory for storing control information that is used for controlling the exchange of this data. Control information can include attributes that can be set for each LDEV in the storage system.

That is, one data processing technology is technology for controlling access by a host computer with respect to each of a plurality of LDEV, for example (Japanese Patent Application Laid Open No. 2000-112822). According to this technology, any attributes that include any of read/writable, write-prohibited and reading/write-prohibited are set for each LDEV. A read/write command from the host computer is processed in accordance with the attribute that is set for the logical storage device constituting the reading/writing target. This attribute can be included in control information that is stored in the control memory.

SUMMARY OF THE INVENTION

According to Japanese Patent Application Laid Open No. 2000-112822, when data in an LDEV for which an attribute such as write-prohibited (known as an 'access control attribute' hereinbelow) has been established is moved to an LDEV in a storage system that is separate from the storage system comprising the LDEV, the movement-destination data cannot be protected in the same manner as the movement-source data. This is because management of access control attributes is not executed by the separate storage system comprising the LDEV of the data movement destination.

Further, according to Japanese Patent Application Laid Open No. 2000-112822, access control attributes are set with respect to LDEV. For this reason, if an access control attribute that signifies write prohibition, for example, is set for an LDEV, even when there is an unoccupied area in the LDEV, data cannot be written to the unoccupied area.

In order to solve the above problems, the present inventors considered establishing a plurality of storage areas (known as 'extents' hereinbelow) in the LDEV that each have a smaller storage capacity than that of the LDEV, establishing an access control attribute such as a write-prohibited attribute for each extent, and storing the access control attributes for each extent in the same LDEV as the extent (Japanese Patent Application Laid Open No. 2004-313874: not yet published at the time of this application).

As a result, if all the data in the LDEV is moved to another LDEV, for example, the access control attributes established for the extents are moved to the other LDEV together with the data in the extents. Therefore, the other LDEV constituting the movement destination of the data can also be expected to protect the data in the same manner as the movement source.

Further, accordingly, the capacity of any wasted unoccupied area that may arise in the LDEV can be reduced. For example, even when an access control attribute that prohibits the writing of data to a first extent is established in the same LDEV, as long as this access control attribute has not been established for a second extent, data can be written to the second extent.

Furthermore, the management of each extent is not limited to access control attributes. Indeed, the existence of a variety of information is considered preferable. For this reason, extent management information that includes the access control attribute of each extent can be stored in each extent. The larger the number of extents, and greater the number of extent management information items and, consequently, the greater the volume of information of an extent management information group. As a storage location for the extent information group, an LDEV comprising a plurality of extents managed by the extent information group may be considered.

However, in this case, there is a risk of the problem that it will take a long time to process an access request from the host computer (read request or write request). This is because, normally, the speed with which data is read from an LDEV is slower than the speed with which data is read from memory and, in a case where the extent management information group is stored in the LDEV, each time an access request is received from a host computer, processing to access the LDEV and read one or more extent management information items from an extent management information group is required.

As a method of solving this problem, a method that stores the extent management information group in memory may be considered. However, with this method, another problem arises, i.e. the costs of the storage system increase. This is because, if there are a great number of extents existing in the storage system, the volume of information of the extent management information group is also proportionately huge and a large memory storage capacity is required in order to store an extent management information group with this huge volume of information. This becomes an increasingly large problem as the number of LDEV increases, in other words, as the number of extent management information groups increases.

Therefore an object of the present invention is to suppress an extension of the time required to process an access request from a communication device.

A further object to the present invention is to implement the above object without producing a huge memory storage capacity.

Further objects of the present invention will become apparent from the following description.

The data-processing system according to a first aspect of the present invention is communicably connected to a communication device and comprises at least one computer; a program storage area that stores at least one computer program that is read by the at least one computer; a storage device that comprises a plurality of extents constituting subareas that are able to store data; and an attribute storage area for storing a plurality of access control attributes corresponding with the plurality of extents. The access control attributes corresponding with the extents are access control attributes of a type that is selected from among a plurality of types of access control attributes. The plurality of types of access control attributes do not include an access control attribute signifying read prohibition but include an access control attribute signifying write permission, an access control attribute signifying read permission, and an access control attribute signifying write prohibition.

In this case, the at least one computer (control means, for example) that reads the at least one computer program retrieves, when a write request is received from a communication device that transmits write target data and the write request, an access control attribute of a write-destination extent according to the write request from among the plurality of access control attributes, judges whether the access control attribute thus retrieved is an access control attribute signifying write prohibition, and controls whether the write target data is written to the write destination extent in accordance with the result of the judgment. Further, when a read request for read target data is received from a communication device that transmits the read request, the at least one computer reads the read target data from a read source extent according to the read request without retrieving the access control attribute of the read source extent from among the plurality of access control attributes.

Here, an extent is, for example, not established physically in a storage device but, instead, can be established logically in a storage area (memory, for example) separate from the storage device. When the extent is established logically, information expressing that an area extending from a particular position to another position of the storage device is one extent (or that an area with a certain storage size from a particular position is one extent) can be stored in the separate storage area, for example.

In one embodiment, the at least one computer is able to execute the processing of (1) or (2) below in response to a request from the communication device:

(1) processing that renders an area, which includes an area having at least one write target data item that is written to the storage device between a first time and a second time, one extent, and stores the access control attribute for the extent in the attribute storage area; and (2) processing that establishes one extent at a first time, and stores in the attribute storage area an access control attribute for the extent thus set at a second time after write target data has been stored in the extent thus established.

The data processing system according to a second aspect of the present invention is communicably connected to a communication device and comprises at least one computer; a program storage area that stores at least one computer program that is read by the at least one computer; a plurality of storage devices that store data; a plurality of extents provided in at least one storage device of the plurality of storage devices; a cache memory area that temporarily stores data that is exchanged between the storage devices and the communication device; a control memory area that stores information for controlling the exchange of the data; a first management area that stores a plurality of access control attributes that correspond with the plurality of extents respectively; and a second management area that stores, for each storage device, information on the existence of a write prohibition extent that indicates whether a write prohibition extent, which is an extent that corresponds with an access control attribute signifying write prohibition, is included in the plurality of extents. The first management area exists in the storage device that comprises the plurality of extents. The second management area exists in at least one of the cache memory area and the control memory area.

In this case, the at least one-computer (control means, for example) that reads the at least one computer program judges, when a write request is received from a communication device that transmits write target data and the write request, whether the write prohibition extent exists in a write-destination storage device by accessing the second management area and referencing information on the existence of the write prohibition extent that corresponds with the write-destination storage device according to the write request. Further, when it is judged that the write prohibition extent exists in the write destination storage device, the at least one computer accesses the first management area that is provided in the write destination storage device, retrieves, from among the plurality of access control attributes, an access control attribute that corresponds with the write-destination extent among a plurality of extents provided in the write destination storage device, judges whether the access control attribute thus retrieved is an access control attribute signifying write prohibition, and controls whether the write target data is written to the write destination extent in accordance with the result of the judgment.

According to one embodiment, the second management area is able to store, for each storage device, information on the existence of a read prohibition extent that indicates whether a read prohibition extent, which is an extent corresponding with an access control attribute signifying read prohibition, is included in the plurality of extents. The at least one computer is able to judge, when a read request for read target data is received from a communication device that transmits the read request, whether the read prohibition extent exists in a read source storage device by accessing the second management area and referencing information on the existence of a read prohibition extent that corresponds with the read source storage device according to the read request. Further, when it is judged that the read prohibition extent exists in the read source storage device, the at least one computer is able to access the first management area that is provided in the read source storage device, retrieve, from among the plurality of access control attributes, an access control attribute that corresponds with a read source extent among a plurality of extents that are provided in the read source storage device, judge whether the access control attribute thus retrieved is an access control attribute signifying read prohibition, and control whether the read target data is read from the read source extent in accordance with the result of the judgment.

According to one embodiment, the data that is exchanged via the cache memory between the communication device and the storage devices may include management information that includes a variety of management information elements for managing the storage device and host data constituting data that is read or written by a host computer constituting one of the communication devices. In this case, the at least one computer is able to preferentially retain, in the cache memory area, a management information element included in the management information among data that is retained in the cache memory area, which is data that is written to the storage device, and erase the host data from the cache memory area first.

According to one embodiment, the storage device can comprise a management information storage area for storing a variety of management information items relating to the constitution of the storage device and a host storage area for storing host data, which is data that is read or written by the host computer constituting one of the communication devices. The control memory area is able to store, for each storage device, an update status indicating whether the management information storage area is being updated and an update number that is changed when the management information storage area has been updated. In this case, the at least one computer is able to perform the following processing: set a lock indicating that the writing of data to a certain storage device is prohibited when management information is received from a communication device that transmits the management information for storage in the certain storage device; change the update status of the certain storage device to an update in progress status indicating that an update is in progress; write the received management information to the management information storage area of the certain storage device; change the update number corresponding with the certain storage device when the writing of the management information is complete; change the update status of the certain storage device to a no update status indicating that there is no update in progress; reference the update status and update number of the certain storage device; read management information from the management information storage area of the certain storage device after referencing the update status and update number of the certain storage device; reference the update status and update number of the certain storage device again after reading the management information; and judge that the management information thus read is valid when neither of the update statuses that are referenced before and after reading the management information are the update in progress status and the update numbers that are referenced before and after reading the management information are both the same number.

According to one embodiment, of a management information storage area for storing a variety of management information items relating to the constitution of the storage device and a host storage area for storing host data, which is data that is read or written by the host computer constituting one of the communication devices, the storage device can comprise at least the host storage area. In this case, in the event of compliance with a predetermined condition, the at least one computer is able to prohibit at least one of the establishment of the management information storage area for the certain storage device and the removal of the management information storage area from the certain storage device. The predetermined condition may be at least one of the conditions that the certain storage device be connected to the host computer and that at least one extent is established for the certain storage device.

According to one embodiment, another storage device that has the same storage size as the storage device may exist. The storage device can comprise a management information storage area for storing a variety of management information items relating to the constitution of the storage device and a host storage area for storing host data, which is data that is read or written by the host computer constituting one of the communication devices. The other storage device can comprise another management information storage area with the same storage capacity as the management information storage area in the same location as the location where the management information storage area of the storage device exists. The at least one computer is able to copy all the information in the storage device to the other storage device in which the other management information storage area is prepared.

According to one embodiment, another storage device that has the same storage size as the storage device may exist. The storage device can comprise a management information storage area for storing a variety of management information items relating to the constitution of the storage device and a host storage area for storing host data, which is data that is read or written by the host computer constituting one of the communication devices. The other storage device can comprise another host storage area but does not comprise another management information storage area. The at least one computer is able to copy all the information in the storage device to the other storage device in which the other management information storage area is prepared and adjust the address of the other host storage area of the other storage device.

According to one embodiment, another storage device that has the same storage size as the storage device may exist. The storage device can comprise a management information storage area for storing a variety of management information items relating to the constitution of the storage device and a host storage area for storing host data, which is data that is read or written by the host computer constituting one of the communication devices. The at least one computer is able to prohibit the establishment of information in the storage device for the copy destination when the other storage device conforms to a predetermined condition. The predetermined condition may be that at least one extent be established for the other storage device.

There are a plurality of access control attributes each corresponding with a plurality of extents provided in a storage device in the data processing method according to a third aspect of the present invention. The access control attributes corresponding with the extents are access control attributes of a type that is selected from among a plurality of types of access control attributes. The plurality of types of access control attributes do not include an access control attribute signifying read prohibition but include an access control attribute signifying write permission, an access control attribute signifying read permission, and an access control attribute signifying write prohibition. In this case, the data processing method executes the following processing: receive a write request from a host computer that transmits write target data and the write request; retrieve an access control attribute of a write destination extent according to the received write request from among a plurality of access control attributes that each correspond with a plurality of extents provided in the storage device; judge whether the access control attribute thus retrieved is an access control attribute signifying write prohibition; control whether the write target data is written to the write destination extent in accordance with the result of the judgment; receive the read request from a host computer that transmits a read request for read target data; and read the read target data from a read source extent without retrieving the access control attribute of the read source extent according to the received read request from among the plurality of access control attributes.

According to one embodiment, the data processing method executes the processing of (1) or (2) below in response to a request from the communication device:

(1) processing that renders an area, which includes an area having at least one write target data item that is written to the storage device between a first time and a second time, one extent, and stores the access control attribute for the extent in the attribute storage area; and (2) processing that establishes one extent at a first time, and stores in the attribute storage area an access control attribute for the extent thus set at a second time after write target data has been stored in the extent thus established.

The data processing method according to a fourth aspect of the present invention, wherein a plurality of extents provided in at least one storage device of the plurality of storage devices, a cache memory area that temporarily stores data that is exchanged between the storage devices and the communication device, a control memory area that stores information for controlling the exchange of the data, a first management area that stores a plurality of access control attributes that correspond with the plurality of extents respectively, and a second management area that stores, for each storage device, information on the existence of a write prohibition extent that indicates whether a write prohibition extent, which is an extent that corresponds with an access control attribute signifying write prohibition, is included in the plurality of extents, are provided. The first management area exists in the storage device that comprises the plurality of extents and the second management area exists in at least one of the cache memory area and the control memory area. In this case, the data processing method executes the following processing: when a write request is received from a communication device that transmits write target data and the write request, a judgment of whether the write prohibition extent exists in a write-destination storage device is performed by accessing the second management area and referencing information on the existence of the write prohibition extent that corresponds with the write-destination storage device according to the write request; and, when it is judged that the write prohibition extent exists in the write destination storage device, the first management area that is provided in the write destination storage device is accessed, an access control attribute that corresponds with a write-destination extent among a plurality of extents provided in the write destination storage device is retrieved from among the plurality of access control attributes, a judgment of whether the access control attribute thus retrieved is an access control attribute signifying write prohibition is performed, and control of whether the write target data is written to the write destination extent is performed in accordance with the result of the judgment.

The data processing method according to a fifth aspect of the present invention comprises an attribute storage area that stores a plurality of access control attributes each corresponding with a plurality of extents that are provided in a storage device; write request receiving means for receiving a write request from a host computer that transmits the write request and write target data; attribute retrieval means for retrieving an access control attribute of a write destination extent corresponding with the received write request from among the plurality of access control attributes; write prohibition judging means for judging whether the retrieved access control attribute is an access control attribute that signifies write prohibition; write control means for controlling whether the write target data is written to the write destination extent in accordance with the judgment results; read request receiving means for receiving the read request from a host computer that transmits a read request for read target data; and reading means that read the read target data from the read source extent without retrieving the access control attribute of the read source extent from among the plurality of access control attributes according to the received read request. The access control attribute corresponding with the extent is an access control attribute of a type that is selected from among access control attributes of a plurality of types. The access control attributes of the plurality of types do not include an access control attribute that signifies read prohibition but instead include an access control attribute that signifies write permission, an access control attribute that signifies read permission, and an access control attribute that signifies write prohibition.

In a data processing system according to a sixth aspect of the present invention, there are a plurality of extents provided in at least one storage device of a plurality of storage devices. This data processing system comprises a cache memory area for temporarily storing data that is exchanged between a storage device and the communication device, a control memory area for storing information for controlling the exchange of the data, a first management area for storing a plurality of access control attributes corresponding with the plurality of extents; and a second management area for storing, for each storage device, information on the existence of a write-prohibited extent that expresses whether a write-prohibited extent constituting an extent corresponding with an access control attribute signifying write prohibition is included in the plurality of extents. The first management area exists in the storage device with the plurality of extents and the second management area exists in at least one of the cache memory area and the control memory area. In this case, the data processing system comprises means for receiving the write request from a communication device that transmits write target data and a write request, means for accessing the second management area and referencing information on the existence of a write prohibition extent corresponding with a write destination storage device according to the write request, means for judging, from the referencing, whether the write prohibition extent exists in the write destination storage device, means for accessing the first management area provided in the write destination storage device when it is judged that the write prohibition extent exists in the write destination storage device, means for retrieving, from among the plurality of access control attributes, the access control attribute corresponding with a write destination extent among a plurality of extents provided in the write destination storage device, means for judging whether the retrieved access control attribute is an access control attribute signifying write prohibition, and means for controlling, in accordance with a result of the judgment, whether the write target data is written to the write destination extent. Each of the means above can be implemented by means of hardware, a computer program, or a combination thereof. Further, each of the above means may be written as steps. In this case, a data processing method can be written.

As long as the communication device is a device that comprises a communication function, any type of communication device can also be adopted. For example, the communication device can be a host computer, another data-processing system (storage system, for example), a management terminal or a maintenance terminal (described later).

Furthermore, the storage device may be a physical storage device or a logical storage device that is provided on a physical storage device.

In addition, at least one computer may be a microprocessor, or may be a personal computer or a computer machine such as a server, for example.

BRIEF DESCRIPTION OF THE DRAWINGS

FIG. 4A is an explanatory view of an extent management information item 306; FIG. 4B is an explanatory view illustrating correspondence between access control attributes that are set for extents, the states of a variety of status flags expressing the access control attributes, and the access control action that is executed in the case of the access control attributes, according to the first example of the first embodiment of the present invention;

FIG. 5 shows an example of a type of information element that is included in LDEV common information 303;

FIGS. 6A and 6B are explanatory views of a management block; FIG. 6C illustrates all the combinations of values of these four flags;

FIG. 9 shows an example of information that is written to a cache memory 142 or control memory 144;

FIG. 14A shows an example of the display of LDEV common information 303; FIG. 14B shows an example of the display of extent management information;

FIG. 15A shows an example of an extent setting method; FIG. 15B shows another example of an extent setting method;

FIG. 18A illustrates access to an external LDEV corresponding with a virtual LDEV when access to the virtual LDEV is made by a host in a third example of the first embodiment of the present invention; FIG. 18B shows a constitutional example of information that is used in order to judge a VMA type from a VMA identifier; FIG. 18C shows that the VMA identifier in the external LDEV can be reflected in a virtual LDEV;

DESCRIPTION OF THE PREFERRED EMBODIMENTS

A few embodiments according to the first embodiment of the present invention will be illustrated hereinbelow with reference to the drawings.

EXAMPLE 1

Figure 1:
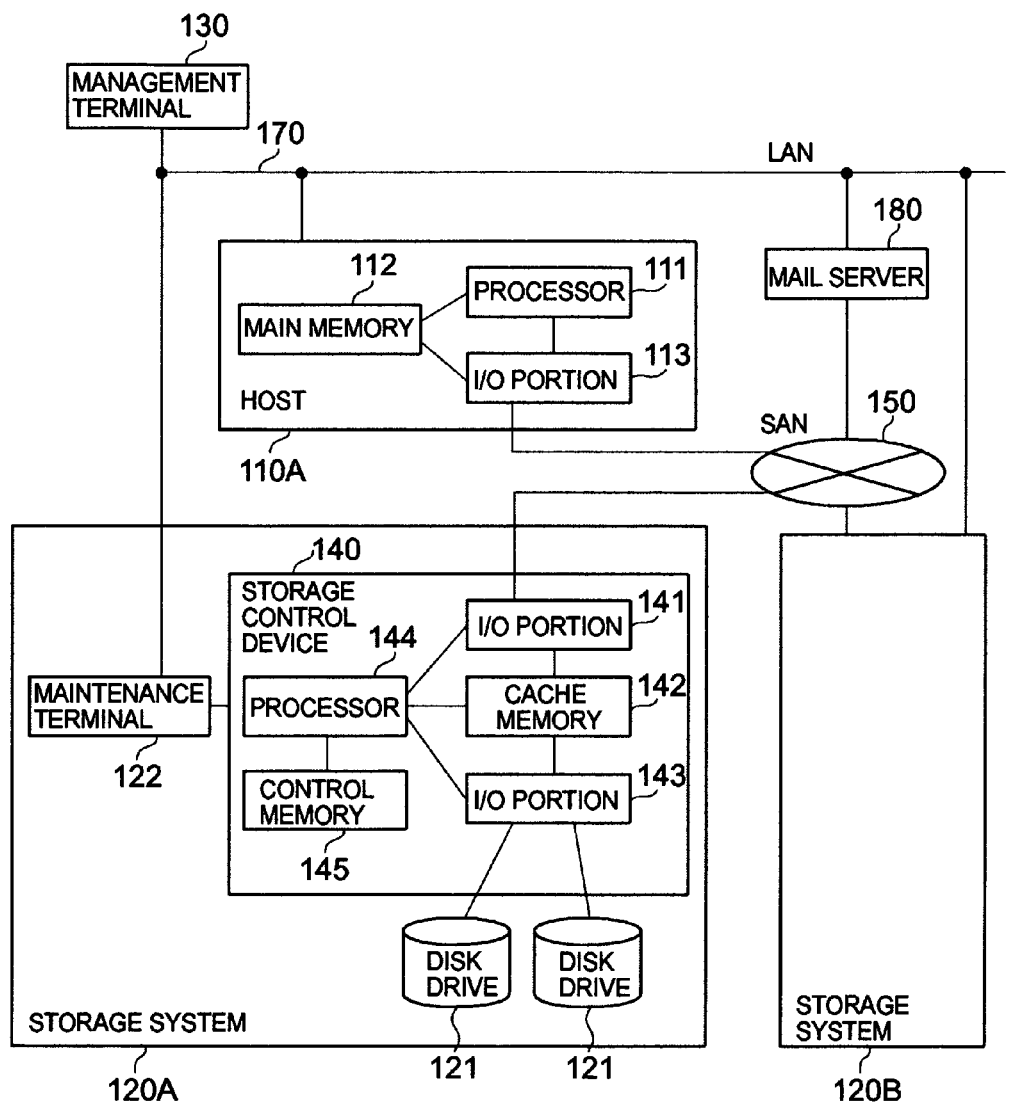
FIG. 1 is a block diagram showing the hardware constitution of a computer system according to a first example of a first embodiment of the present invention.

FIG. 1 is a block diagram showing the hardware constitution of a computer system according to a first example of the first embodiment of the present invention.

The computer system according to the first example comprises a host computer (abbreviated as 'host' hereinbelow) 110; a storage system 120, a management terminal 130, and a mail server 180. The host 110, storage system 120, management terminal 130, and mail server 180 are connected to a first communication network such as a LAN 170. In addition, the host 110, storage system 120, and mail server 180 are connected to a second communication network such as a storage area network (SAN) 150. This computer system may include a plurality of hosts 110 and a plurality of storage systems 120. One host 100A and two storage systems 120A and 120B are representatively shown in FIG. 1 by way of example.

A host 110A comprises an I/O portion (interface circuit, for example) 113 that communicates with the storage system 120 via a SAN 150 and controls the transfer of data to and from the storage system 120; a main memory 112 where computer programs, data and so forth are stored; and a processor 111 for controlling the operation of a host 110A by executing a computer program stored in the main memory 112.

Storage systems 120A and 120B can both have substantially the same constitution and, therefore, 120A will be illustrated representatively by way of example. Storage system 120A can be a disk array device comprising one or a plurality of disk drives (hard disk drive, for example) 121, for example. The storage system 120A comprises a maintenance terminal 122 and storage control device 140 in addition to the disk drives 121.

The maintenance terminal 122 is a computer device comprising a processor, a memory, and so forth, for example (a notebook-type personal computer, for example) that is capable of communicating with the management terminal 130 via the LAN 170. The maintenance terminal 122 is able to update information that is recorded in the control memory in the storage control device 140 in response to an instruction from the operator of the management terminal 130 or the maintenance terminal 122, for example, and is able to update information in a logical storage device that is provided in the disk drives 121, for example.

The storage control device 140 is a device that controls the operation of the storage system 120A. The storage control device 140 comprises an I/O portion (interface circuit, for example) 141 for controlling the transfer of data that is communicated to and from the host 110A via the SAN 150, and a cache memory 142 for temporarily storing data that is exchanged between the host 110A and the disk drives 121. Further, the storage control device 140 comprises an I/O portion (interface circuit, for example) 143 for controlling the transfer of data that is communicated to and from the disk drives 121, a control memory 145 in which a variety of information such as computer programs is stored, and a processor 144 for controlling the operation of the storage control device 140 by executing a computer program that is stored in the control memory 145.

The management terminal 130 is a computer that communicates with and manages the host 110A, the storage system 120, and the mail server 180 via the LAN 170. The hardware constitution of the management terminal 130 is the same as that of the host 110A and therefore an illustration and description thereof are omitted here. The management terminal 130 is able to perform a number of operations as an I/O console of the maintenance terminal 122. That is, maintenance, management, and so forth of the storage system 120 can be performed by the management terminal 130 and maintenance terminal 122.

The mail server 180 is a computer that provides electronic mail services to other computers (not illustrated) connected via the LAN 170. The hardware constitution of the mail server 180 is the same as that of the host 110A and, therefore, an illustration and description thereof will be omitted here. The mail server 180 stores electronic mail in the storage system 120B when providing electronic mail services. Further, the mail server 180 reads electronic mail that is stored in the storage system 120B with predetermined timing (at a predetermined time every day, for example) via the SAN 150 and transfers the electronic mail to the host 110A via the LAN 170. The host 110A is a so-called archive server, for example, and stores electronic mail that is transferred from the mail server 180 to the storage system 120A.

The above description is a description of the hardware constitution of the computer system according to the first example. Further, the transfer of electronic mail from the mail server 180 to the host 110A may be executed by means of a request from the host 110A or may be executed by means of a request from the mail server 180.

Furthermore, the electronic mail may be transferred directly from the storage system 120B to the storage system 120A via the SAN 150 without passing via the LAN 170 as a result of an instruction from the mail server 180 or host 110A.

In addition, the host 110A may read electronic mail that is stored in the storage system 120B via the SAN 150 with predetermined timing and may store the electronic mail data thus read in the storage system 120A.

In addition, the mail server 180 may provide electronic mail services by using the storage system 120A and store the electronic mail in the storage system 120A. In this case, the electronic mail may be copied, with predetermined timing, from an LDEV in the storage system 120A that is used by the mail server 180 to another LDEV in the storage system 120A that is employed by the host 110A. The copy processing may be executed by the storage control device 140 of the storage system 120A on the basis of a command from the mail server 180 or the host 110A. Alternatively, the host 110A may read electronic mail from an LDEV in the storage system 120A and transfer the electronic mail thus read to another LDEV in the storage system 120A that is employed by the host 110A.

Figure 2:
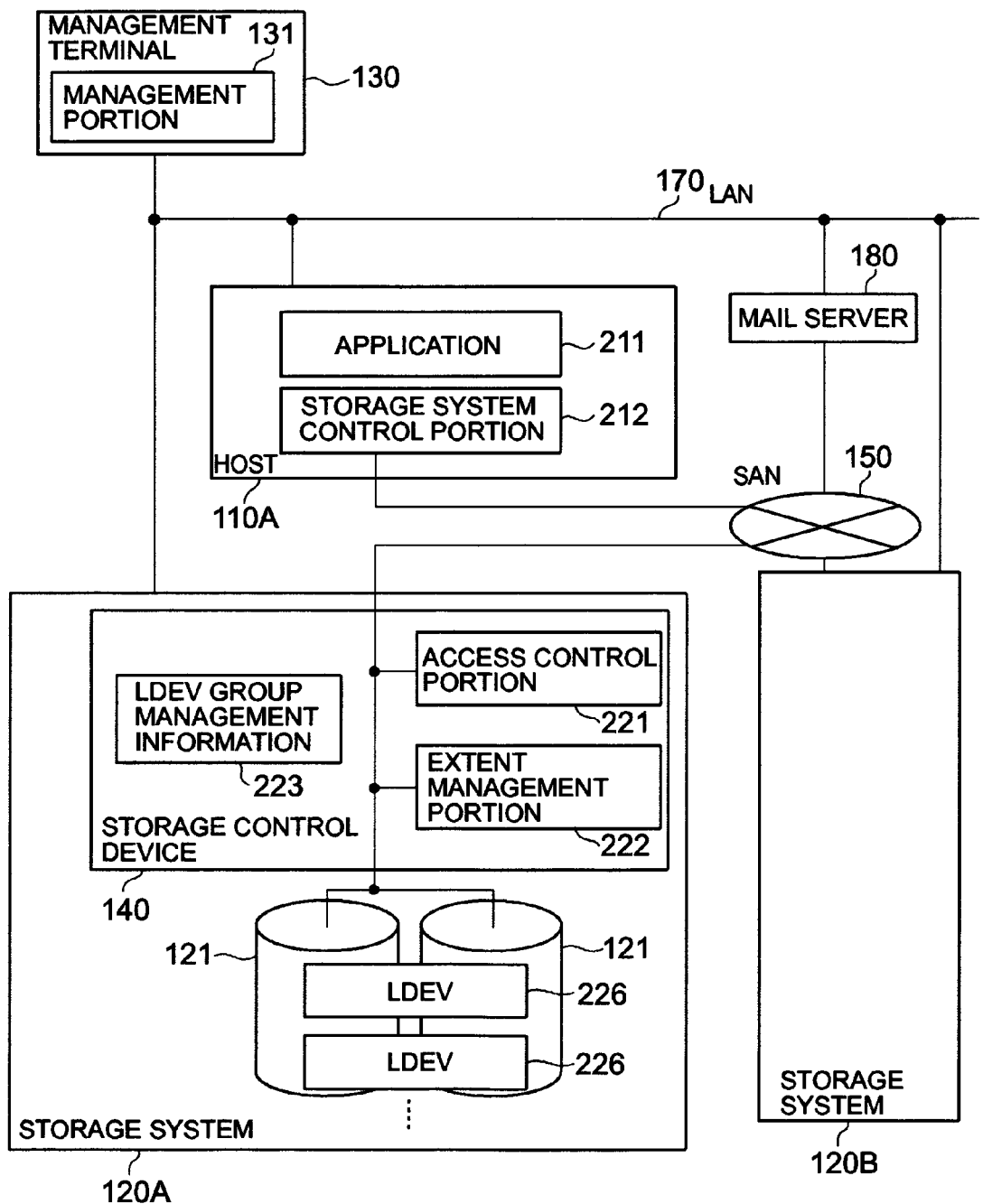
FIG. 2 is a function block diagram of a computer system according to the first example of the first embodiment of the present invention.

FIG. 2 is a function block diagram of the computer system according to the first example of the first embodiment of the present invention. A description of the parts in FIG. 2 that are common to FIG. 1 will be omitted here.

A plurality of computer programs can be stored in the main memory 112 of the host 110A. Computer programs that are included in the plurality of computer programs may include an application 211 and a storage system control portion 212, for example.

The application 211 is a program that serves to allow the host 110A to function as an archive server. The host 110A may have a plurality of applications 211 in order to implement the other functions.

The storage system control portion 212 is a resident-type computer program, for example, which controls the writing of data to the storage system 120A and the reading of data from the storage system 120A. The storage system control portion 212 has a function for setting the access control attribute of each extent in response to an instruction from the application 211, for example.

The management portion 131 in the management terminal 130 is a computer program for managing the host 110A, the storage system 120, and the mail server 180. The management portion 131 may be constituted by a plurality of management programs such as a management program that manages the host 110A, a management program for managing the storage system 120, and a management program for managing the mail server 180, for example. Alternatively, each of the above management programs may be loaded on a different management terminal 130.

The LDEV 226 in the storage system 120A is sometimes also called a logical volume or a logical unit and is a logical storage device that is provided on one or a plurality of disk drives 121. One LDEV 226 may be constituted by a partial storage area in one disk drive 121 or by a storage area of a plurality of disk drives 121. An optional number of LDEV 226 can be established in the storage system 120A. An optional number of extents (see FIG. 3) can be established in each LDEV 226. An 'extent' is a storage area that is established in an LDEV 226. The size of the storage area may be smaller than one LDEV 226, may be of a predetermined fixed size, or may be of a size chosen by the user. In this example, a variety of access control attributes can be established for each extent.

A plurality of computer programs can be stored in the control memory 145 of the storage system 120A and computer programs that are included in the plurality of computer programs include an access control portion 221 and an extent management portion 222, for example.

The access control portion 221 accesses the LDEV 226 in accordance with an access request from the host 110A (that is, a data write request or read request) and executes data writing or reading. When a write-prohibition access control attribute or other access control attribute has been established for the access destination extent, the access control portion 221 controls access in accordance with the access control attribute.

The extent management portion 222 manages the extents in the LDEV 226. More specifically, for example, the extent management portion 222 is able to execute at least one of the new creation of an extent, the deletion of an extent, and the setting of an access control attribute for an extent.

LDEV group management information 223 is information for managing a plurality of LDEV 226 that are provided in the storage system 120A and is stored in the control memory 145, for example. The LDEV group management information 223 includes, for example, for each LDEV 226, an LDEV number for identifying the LDEV 226 (may be an ID of another type rather than a number) and information indicating whether a volume management area (known as a 'VMA' hereinbelow) exists in the LDEV 225.

A summary of the computer system according to a first example of the first embodiment of the present invention was described hereinabove. Further, in the description above, the cache memory 142 and control memory 145 need not necessarily be separate physical memories. Instead, a memory area that is handled as a cache memory 142 and a memory area that is handled as the control memory 145 may be prepared in the same memory, for example.

Further, the extent management and access control, and so forth that is performed in this example will be described in detail hereinbelow.

Figure 3:
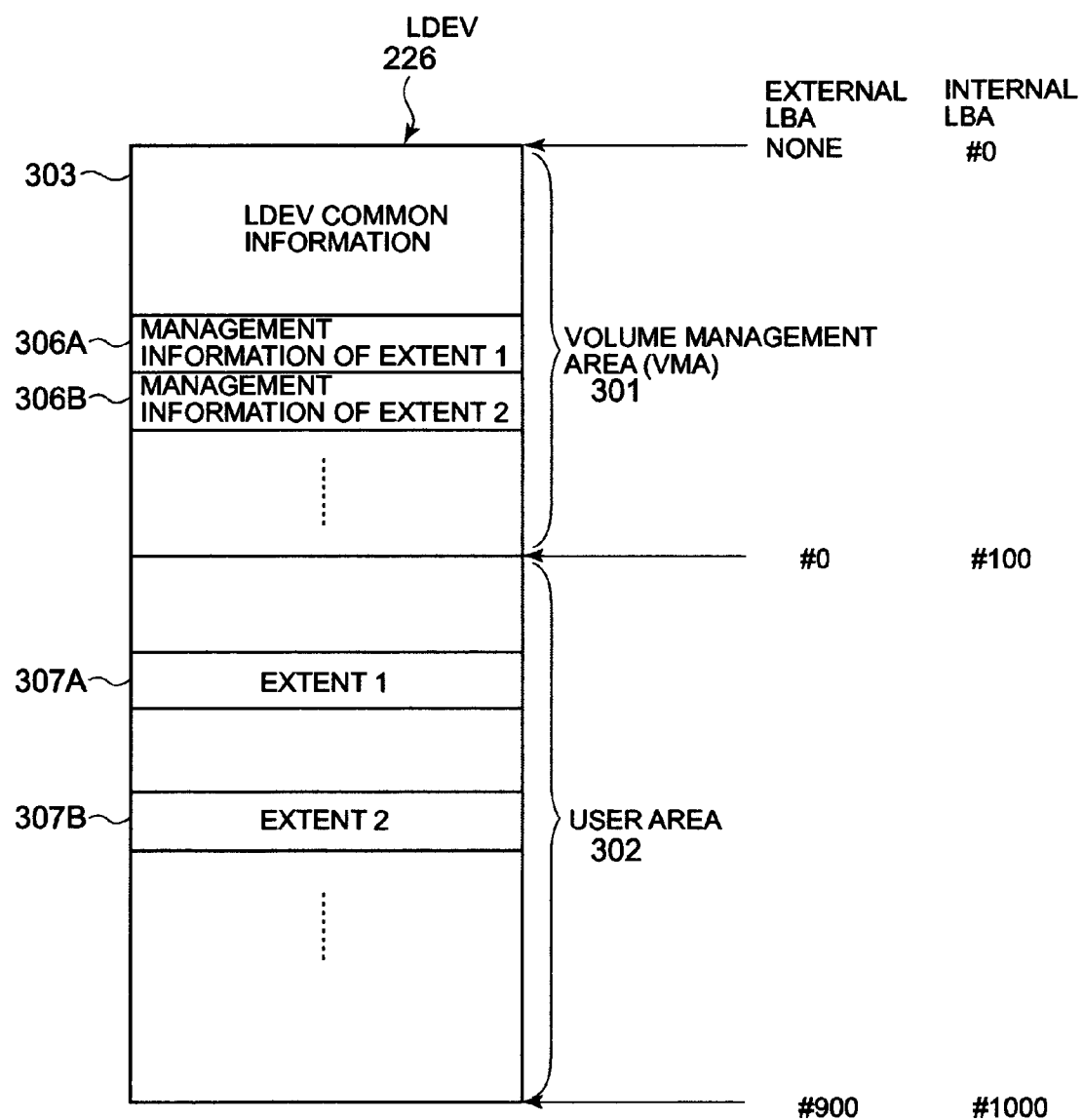
FIG. 3 shows a constitutional example of an LDEV 226.

FIG. 3 shows a constitutional example of the LDEV 226. Further, in the following description, when any target of a plurality of targets is acceptable, the LDEV may be written only with a new number without appending a branch code thereto. For example, in a case where any extent management information item among a plurality of extent management information items 306A, 306B, and so forth, is acceptable, the information is written as 'extent management information 306' without appending the branch codes 'A' and 'B' and so forth thereto.

The storage areas of the LDEV 226 are broadly classified as a volume management area (VMA) 301 and a user area 302.

The VMA 301 is an area in which information for managing the LDEV 226 comprising the VMA 301 is stored. On the other hand, the user area 302 is an area where data that is written to and read from the host 110A (in other words, data which the user is to designate the write target or read target) is stored. A plurality of extents 307A, 307B . . . are established in the user area 302 and data is stored in each of the extents 307A, 307B, and so forth. The user is able to establish any given area in the user area 302 as an extent 307. In addition, the user is able to set an optional access control attribute for each extent 307.

LDEV common information 303, a plurality of extents 307A, 307B, . . . and a plurality of extent management information items 306A, 306B, . . . that correspond with the plurality of extents 307A, 307B, . . . are stored in the VMA 301. That is, one extent management information item 306A, for example, which corresponds with one extent 307A, is stored in the VMA 301 for the one extent, for example. In the VMA 301, for example, the LDEV common information 303 is located in a position closer to the leading side than the plurality of extent management information items 306A, 306B, . . . . In other words, for example, the area in which the LDEV common information 303 is stored is located in a position closer to the leading side than the area in which one or a plurality of extent management information items 306A, 306B, . . . are stored.

Each of the areas in the LDEV 226 can be constituted by a logical block (not illustrated). Therefore, each area in the LDEV 226 can be defined by means of a logical block address (LBA) An LBA includes an external LBA that is identified by the host 110A and an internal LBA that is identified by the storage system 120. Although the internal LBA is assigned to the logical block that constitutes the VMA 301, the external LBA is not assigned thereto. In the example in FIG. 3, the LDEV 226 is constituted by logical blocks LBA '0' to '1000' and, of these LBA, the number of logical blocks of the VMA 301 is 100. In this case, although internal LBA from '0' to '99' are assigned to the logical blocks of the VMA 301, the external LBA are not assigned thereto. Meanwhile, the internal LBA of the leading logical block of the user area 302 is '100' and the external LBA is '0'. In addition, the internal LBA of the end logical block of the user area 302 is '1000' and the external LBA is '900'. The user can establish the VMA 301 and user area 302 with an optional size. Further, the user is also able to establish an LDEV 226 that does not contain the VMA 301. However, in order to establish the extent 307 in the LDEV 226 and to establish an access control attribute for each extent 307, the VMA 301 must be provided in the LDEV 226 or, instead of the VMA 301, information containing the VMA 301 must be stored in the control memory 145.

The extent management information 306 and LDEV common information 303 will be described hereinbelow. Further, in the following description, an information element group that is written to the VMA 301 is sometimes referred to as the 'management information group' for the sake of expedience.

FIG. 4A is an explanatory view of the extent management information 306.

The extent management information 306 includes a variety of information elements relating to the extent 307 corresponding with the extent management information. More specifically, for example, the extent management information 306 includes an extent ID, access control attribute information, a leading external LBA (LBA is an abbreviation for 'logical block address'), extent length, continuous period setting date and time, continuous period and an extent pointer.

'Extent ID' is an identifier for uniquely identifying one of a plurality of extents 307 in the LDEV 226. For example, when a maximum of 65536 extents 307 exists in one LDEV 226, an extent ID of two bytes (sixteen bits) or more may be considered. This is because it is possible to prepare 65536 different extent IDs, which is the same number as the maximum number of extents 307.

'Access control attribute information' expresses any one access control attribute among access control attributes of a plurality of types. The access control attributes of a plurality of types may include four types, which are 'read/writable', 'read only', 'write only' and 'not read/writable', for example. 'Read/writable' signifies that both reading and writing are permitted. 'Read only' signifies that, although reading of the data is permitted once data has been written, updating of this data is not permitted. 'Write only' signifies that, although updating of data is permitted, the reading of data is not permitted. 'Not read/writable' signifies that, once data is written, the data cannot be read or updated.

An access control attribute expressed by the access control attribute information is expressed by the ON and OFF of status flags of a plurality of types. The status flags of a plurality of types include, for example, a write prohibition flag and a read prohibition flag, for example. When the write prohibition flag is set as 'valid' ('1', for example), an attribute such as write prohibition is established for the extent 307 and, as a result, the writing of data to the extent 307 is prohibited. Similarly, when the read prohibition flag is set as 'valid', an attribute such as read prohibition is set for the extent 307 and, as a result, the reading of data from the extent 307 is prohibited. Based on the above, various access control attributes are expressed as shown in FIG. 4B. That is, when the access control attribute is 'read/writable', the write prohibition flag is '0' (invalid) and the read prohibition flag is '0'; in the case of 'read only', the write prohibition flag is '1' (valid) and the read prohibition flag is '0'; in the case of 'write only' the write prohibition flag is '0' and the read prohibition flag is '1'; in the case of 'not read/writable', the write prohibition flag is '1' and the read prohibition flag is '1'. The write prohibition flag and read prohibition flag may be set as a result of the user operating the host 110A, the management terminal 130 or the maintenance terminal 122. Alternatively, the host 110A or storage system 120A may set these flags automatically.

The 'leading external LBA' is the external LBA of the leading logical block of the extent 307.

The 'extent length' is the storage size of the extent (in other words, the storage capacity).

The 'continuous period setting date and time' is the date and time when at least one of the write prohibition flag and read prohibition flag is set to 'valid'.

The 'continuous period' is a period in which invalidation of the write prohibition flag and read prohibition flag is prohibited. The continuous period is set at the time when these flags are set as 'valid', for example. Stated differently, the continuous period can also be called the storage period for data that is stored in the extent 307. For example, the user sets the write prohibition flag as 'valid' at 0:00 on Oct. 1, 2004 and sets the period in which invalidation of the write prohibition flag is prohibited as 'one year', for a certain extent 307. Here, 0:00 on Oct. 1, 2004 is written as the date and time when the write prohibition flag is established as 'valid' for the continuous period setting date and time of the extent 307. In addition, 'one year' is written as the period in which invalidation of the write prohibition flag is prohibited for the continuous period. In this case, the write prohibition attribute is set until 0:00 on Oct. 1, 2005 for the extent 307. That is, data cannot be written to the extent 307 until 0:00 on Oct. 1, 2005.

'Extent pointer' is information that is written when the extent 307 that follows this extent 307 is included in the management block that comprises the extent 307 and is, more specifically, the extent ID of the next extent 307. Further, the management block will be described subsequently.

A description of the various information elements included in the extent management information was provided above.

The LDEV common information 303 is information for managing the LDEV 226 where the LDEV common information 303 is written and this information also includes a plurality of information elements. For example, the LDEV common information 303 may include information elements of at least one type in the total capacity (the storage capacity of the LDEV 226 comprising the VMA 301 and user area 302 itself), the VMA type (information expressing the application of the VMA 301) and the VMA capacity (storage capacity of VMA 301). Further, the LDEV common information 303 can include information of the following types instead of or in addition to these information elements.

FIG. 5 shows an example of a type of information element that is included in LDEV common information 303.

The LDEV common information 303 includes, for example, VMA identifiers, the existence of extents, the existence of a write prohibition extent, an extent ID bitmap, a management block information bitmap, and extent pointers.

The 'existence of extents' is information indicating whether the LDEV 226 comprises one or more extents 307.

The 'existence of a write prohibition extent' is information expressing whether one extent for which an access control attribute relating to write prohibition has been established exists in the LDEV 226.

The 'existence of a read prohibition extent' is information expressing whether one extent for which an access control attribute relating to read prohibition has been established exists in the LDEV 226.

The 'extent ID bitmap' is a bitmap indicating the extent ID that is used by the extent 307 that exists in the LDEV 226. More specifically, for example, when an extent ID is two bytes (sixteen bits), 65536 different extent IDs can exist in the LDEV 226. In this case, the extent ID bitmap has an area of 65536 bits and each bit corresponds with an extent ID that may be present. These bits are flags indicating whether a corresponding extent ID really exists in the LDEV 226.

The 'management block information bitmap' is a bitmap showing the states of management blocks that are established in the LDEV 226 (see FIGS. 6A and 6B described later). More specifically, for example, the management block information bitmap includes status flags that indicate whether each management block 801 comprises an extent 307, whether each management block contains the edge of the extent 307 (starting or end point thereof), whether each management block contains a write prohibition area and whether each management block contains a read prohibition area.

Here, a write prohibition area is an extent 307 for which a write prohibition attribute has been established and a read prohibition area is an extent 307 for which a read prohibition attribute has been established.

When a management block comprises the extent 307, the value of the flag indicating whether the management block comprises the extent 307 is set to 'valid' ('1', for example).

Further, when the management block contains the edge of the extent 307, the value of the flag indicating whether the management block comprises the extent 307 is set to 'valid'. That is, when the value of the flag is 'valid', at least one of the starting point and end point of the extent 307 is contained in the management block 801.

When a write prohibition attribute is set for at least one extent 307 that is contained in the management block 801, the value of the flag indicating whether the management block 801 comprises a write prohibition area is set to 'valid'.

When a read prohibition attribute is set for at least one extent 307 that is contained in the management block 801, the value of the flag indicating whether the management block 801 comprises a read prohibition area is set to 'valid'.

The extent pointer 504 is a pointer to the leading extent 307 in each management block. More specifically, when one extent 307 exists in a management block, the extent pointer 504 is the extent ID of the extent 307 and, when a plurality of extents 307 exist in the management block, the extent pointer 504 is the extent ID of the leading extent 307.

FIGS. 6A and 6B are explanatory views of a management block. More specifically, FIG. 6A shows an example of a case in which one extent 307C spans a plurality of management blocks 801. FIG. 6B illustrates a case where one extent 307D is contained in one management block 801.

The whole of the LDEV 226 is divided into management blocks 801 of a predetermined size (thirty-two megabytes, for example) On the other hand, the position and size of the extent 307 may be decided beforehand or can be optionally determined by the user.

In the example of FIG. 6A, the extent 307C has a starting point midway along a management block 801A, occupies the whole of management blocks 801B and 801C, and has an end point midway along management block 801D. Hereinafter, a management block (801A, for example) containing the edge (starting point) of the extent 307C is sometimes called an 'end point management block'. Further, a management block (801B and 801C, for example) that corresponds to the intermediate section of the extent 307C is sometimes called an 'intermediate management block'. Further, a management block (801D, for example) that contains an edge (end point) of the extent 307C is sometimes called an 'edge management block'.

Meanwhile, in the example in FIG. 6B, the extent 307D is contained in the management block 801F. That is, the management block 801F comprises the edges (starting point and end point) of the extent 307D. Hence, such a management block (801F, for example) is known as an 'edge management block'.

In FIG. 6A, the extent 307C is established in all of the management blocks 801B and 801C. As a result, it is not possible to create a new extent 307 in the management blocks 801B and 801C. In addition, when a write prohibition attribute is established for the extent 307C, data cannot be written to management blocks 801B and 801C.

On the other hand, in FIG. 6B, an extent 307 is not established in management blocks 801E, 801G, and 801H. For this reason, a new extent cannot be created in management blocks 801E, 801G and 801H. Further, data can also be written or read.

Therefore, for each of the intermediate management blocks 801B and 801C and the management blocks 801E, 801G, and 801H, which do not contain an extent 307, it is possible to judge the feasibility of processing such as a processing to create a new extent and to read or write data for each management block 801. As a result, the judgment regarding the feasibility of such processing is simplified.

On the other hand, the feasibility of this processing must be judged in detail for the intermediate management blocks 801B, 801C, and 801F.

The judgment of the feasibility of processing that uses such a management block 801 will now be described in detail with reference to FIG. 6C.

FIG. 6C is an explanatory view of the relationship between the status flag of the management block 801 and the judgment of the feasibility of the processing.

The status flag 901 in FIG. 6C is the content of the management block information bitmap 503 of the extent management information 305 in the volume. More specifically, the status flag 901 includes a flag (903) that indicates whether the management block 801 contains an extent 307, a flag (904) that indicates whether the management block 801 contains the edge of the extent 307, a flag (905) that indicates whether a management block 801 contains a write prohibition area, and a flag (906) that indicates whether the management block 801 contains a read prohibition area.

When the value of the flag (903) indicates whether the management block 801 contains an extent 307 is '1', the management block 801 contains an extent 307. The other flag also has the same meaning.

FIG. 6C illustrates all the combinations of values of these four flags. However, because a management block 801 that does not contain an extent 307 also does not comprise any of an edge of the extent 307, a write prohibition area and a read prohibition area, the combination of rows 926 to 928 and 933 to 936 does not exist.

A processing feasibility judgment 902 is a judgment of whether the management block 801 may be processed. The processing that is judged include the new creation of an extent 307 (907), data writing (910) and data reading (911). The new creation (907) of an extent 307 includes a case where the management block 801 constituting the target of the judgment corresponds to an edge management block (908) of the newly created extent 307 (abbreviated as 'new extent 307' hereinbelow) and a case where the management block 801 corresponds to an intermediate management block (909) of the new extent 307.

In cases where the management block 801 does not contain an extent 307, all the processing is judged to be possible '(OK)'.

In cases where the management block 801 contains an extent 307 (903) and the management block 801 corresponds to an intermediate management block of a new extent 307 (909), it is judged that the new creation of the new extent 307 is 'not possible (NG) (t to 924, 929 to 932).

In cases where the management block 801 contains an extent 307 (903) but does not contain the edge of the extent 307 (904), the management block 801 is an intermediate management block of the extent 307. When the management block 801 corresponds to an edge management block of the new extent 307 (908), it is judged that the new creation of anew extent 307 is 'not possible' (921, 924, 929, 932).

In cases where the management block 801 contains an extent 307 (903) and also comprises the edge of the extent 307 (904), the management block 801 is an edge management block of the extent 307. When the management block 801 corresponds to an edge management block of the new extent 307 (908), there are cases where the new extent 307 can be newly created and cases where the new extent 307 cannot be newly created. As a result, it is judged that a detailed judgment is required (922, 923, 930, and 931).

More specifically, in cases where there is an overlap between the extent 307 and the new extent 307 in the management block 801, the new extent 307 cannot be newly created. On the other hand, in cases where there is no overlap between the extent 307 and the new extent 307 in the management block 801, the new extent 307 can be newly created.

Similarly, in cases where the management block 801 does not contain a write prohibition area (905), the writing of data to the management block 801 is judged to be 'possible' (921, 922, 929, 930). In cases where the management block 801 contains a write prohibition area (905) and does not contain the edge of the extent 307 (904), the writing of data to the management block 801 is judged to be 'not possible' (924, 932). There are also cases where the management block 801 contains a write prohibition area (905) and also comprises the edge of the extent 307 (904) and cases where data can and cannot be written to the management block 801. More specifically, when the position in which data is written is within the write prohibition area, the data cannot be written. As a result, it is judged that a detailed judgment is required (923, 931).

In cases where the management block 801 does not contain a read prohibition area (906), the reading of data from management block 801 is judged to be possible (921 to 924). In cases where the management block 801 contains a read prohibition area (909) and does not contain the edge of the extent 307 (904), the reading of data from the management block 801 is judged to be 'not possible' (929, 932). There are cases where the management block 801 contains a read prohibition area (906) and also comprises the edge of the extent 307 (904) and where data can and cannot be read from the management block 801. More specifically, when the data thus read is within the read prohibition area, the data cannot be read. As a result, it is judged that a detailed judgment is required (930, 931).

A specific example of a processing feasibility judgment that uses a management block 801 such as that described above will now be described with reference to FIGS. 6A to 6C.

In FIG. 6A, in cases where a write prohibition attribute has been established for the extent 307C and a read prohibition attribute has not been established, the management block 801A contains the extent 307C, contains the edge of the extent 307C, contains the write prohibition area, and does not contain a read prohibition area. That is, the status flag 901 of the management block 801A corresponds to row 923 in FIG. 6C.

In cases where the extent 307 is newly created in the management block 801A, when the edge of the new extent 307 is contained in the management block 801, there are times when the extent 307C ad the new extent 307 overlap and when same do not overlap. Therefore, a detailed judgment is required (908). When the extent 307C and the new extent 307 do not overlap, the new extent 307 can be newly created.

When the edge of the new extent 307 is contained in the management block 801, the extent 307C and the new extent 307 must overlap. As a result, the new extent 307 cannot be newly created (909).

In cases where data is written to the management block 801A, if the position in which the data is written is outside the extent 307C, the data can be written. However, if the position in which the data is written is inside the extent 307C, the data cannot be written. Hence, it is necessary to judge in detail whether the position in which the data is written is outside or inside the extent 307C (910).

A read prohibition area is not contained in the management block 801A. As a result, all the data in the management block 801A can be read (911).

The extent management, access control, and so forth, performed in this example were described hereinabove. In this example (and/or other subsequent examples), the technology disclosed in Japanese Patent Application No. 2004-313874 (not yet published at the time of this application) can be adopted.

Further, this example will be described in more detail below.

Figure 7A:
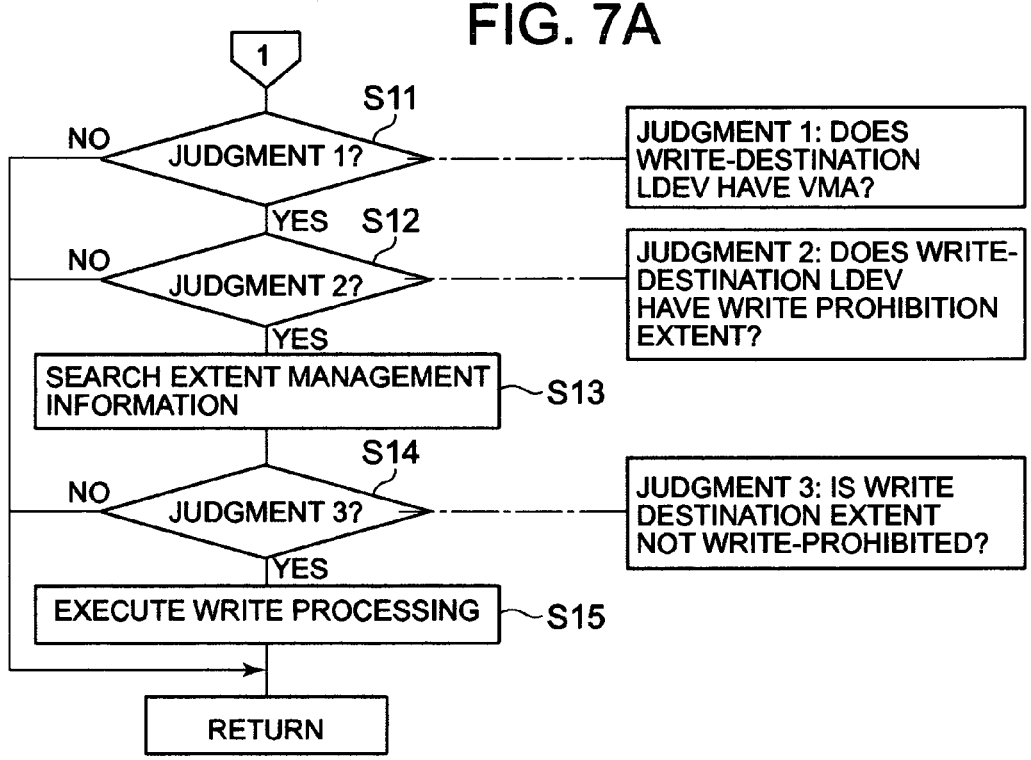
FIG. 7A shows the flow of write request processing that is executed when a write request is received by the host.

FIG. 7A shows the flow of write request processing that is executed when a write request is received by the host 110A.

When the processor 144 receives a write request (a write command based on the SCSI protocol, for example) and write target data from the host 110A via the I/O portion 141, a cache segment (in other words, a cache area) is secured in the cache memory 142 and at least write target data is stored in the secured cache segment.

The processor 144 performs a judgment of whether the VMA 301 exists in the LDEV 226 that carries the area constituting the write target of the write request (write target LDEV hereinbelow) (step S1). For example, the processor 144 is able to judge S11 by checking whether all or part (a predetermined information element, for example) of the LDEV common information 303 (or extent management information 306) exists in the VMA 301 of the write target LDEV 226. Further, at this time, when all or a predetermined part (VMA identifier, for example) of the reference target, that is, the LDEV common information 303 (or extent management information 306) exists in the cache memory 142, the processor 144 accesses the cache memory 142 and references the reference target and, in cases where the reference target does not exist in the cache memory 142, the processor 144 is able to read the reference target from the write target LDEV 226 to the cache memory 142 and subsequently reference the reference target by accessing the cache memory 142. In a case where the reference target can be referenced, the judgment result that the VMA 301 exists can be obtained.

In cases where the judgment result that the VMA 301 exists in the write target LDEV 226 is obtained (Yes in S11), the processor 144 judges whether an extent for which write prohibition has been established exists in the write target LDEV 226 (S12). The processor 144 references an information element 'existence of write prohibition extent' in the LDEV common information 303, for example, and is able to judge S12 by checking whether the fact that one extent for which an access control attribute relating to write prohibition has been established exists in the LDEV 226 is mentioned. Further, thereupon, the processor 144 references the information element 'existence of write prohibition extent' if same exists in the cache memory 142. If the information element 'existence of write prohibition extent' does not exist, the processor 144 may read at least the information element 'existence of write prohibition extent' from the LDEV 226 to the cache memory 142 and reference the information element thus read. In cases where, based on the information element 'existence of write prohibition extent', it is specified that an extent for which write prohibition has been established does not exist, the judgment result that an extent for which write prohibition has been established does not exist in the write target LDEV 226 can be obtained.

In cases where the judgment result that an extent for which write prohibition has been established does not exist in the write target LDEV 226 can be obtained (Yes in S22), the processor 144 retrieves extent management information 306 corresponding with the extent ('write destination extent' hereinbelow) that contains a write destination area according to a write request from the VMA 301 (S13). In the case of a retrieval hit, for example, the processor 144 reads the extent management information 306 thus retrieved from the VMA 301 and writes this information to the cache memory 142.

The processor 144 references a predetermined information element 'access control attribute information' in the extent management information 306 and, by checking whether the information element expresses write prohibition (in other words, whether the write prohibition flag is valid), judges whether write prohibition has been established for the write destination extent (S14). In cases where it is specified that the information element 'access control attribute information' does not express write prohibition (in other words, that writing is permitted), the judgment result that write prohibition has not been established for the write destination extent can be obtained.

In cases where the judgment result that write prohibition has not been established for the write destination extent is obtained (Yes in S24), the processor 144 executes write processing (S15). More specifically, for example, the processor 144 reads the write target data from the secured cache segment and writes the write target data thus read to the write destination extent via the I/O portion 143.

The flow of write request processing was detailed above.

According to this description, whenever a write request for the respective LDEV 226 is received, access is made to the VMA 301, that is, to the disk drive 121. Thereupon, in cases where the reference target is read to the cache memory 142 instead of to the VMA 301, access is made to the cache memory 142. Further, in order to judge whether data may be written to the write destination extent according to a write request, extent management information corresponding with the write destination extent must be retrieved from the VMA and the particular access control attribute of the write destination extent must be judged from the extent management information thus retrieved.

Thus, before write target data is written to the extent after a write request is received, access is made a plurality of times to the disk drives 121 and/or to the cache memory 142. Hence, the time taken by the write request processing is long in comparison with a case where write target data is written simply to an area designated by the write request.

This problem also exists for read request processing that is performed in response to a read request in the absence of a special scheme.

However, in this example, a reduction in the time taken for the read request processing is attempted by means of the following scheme.

Figure 8:
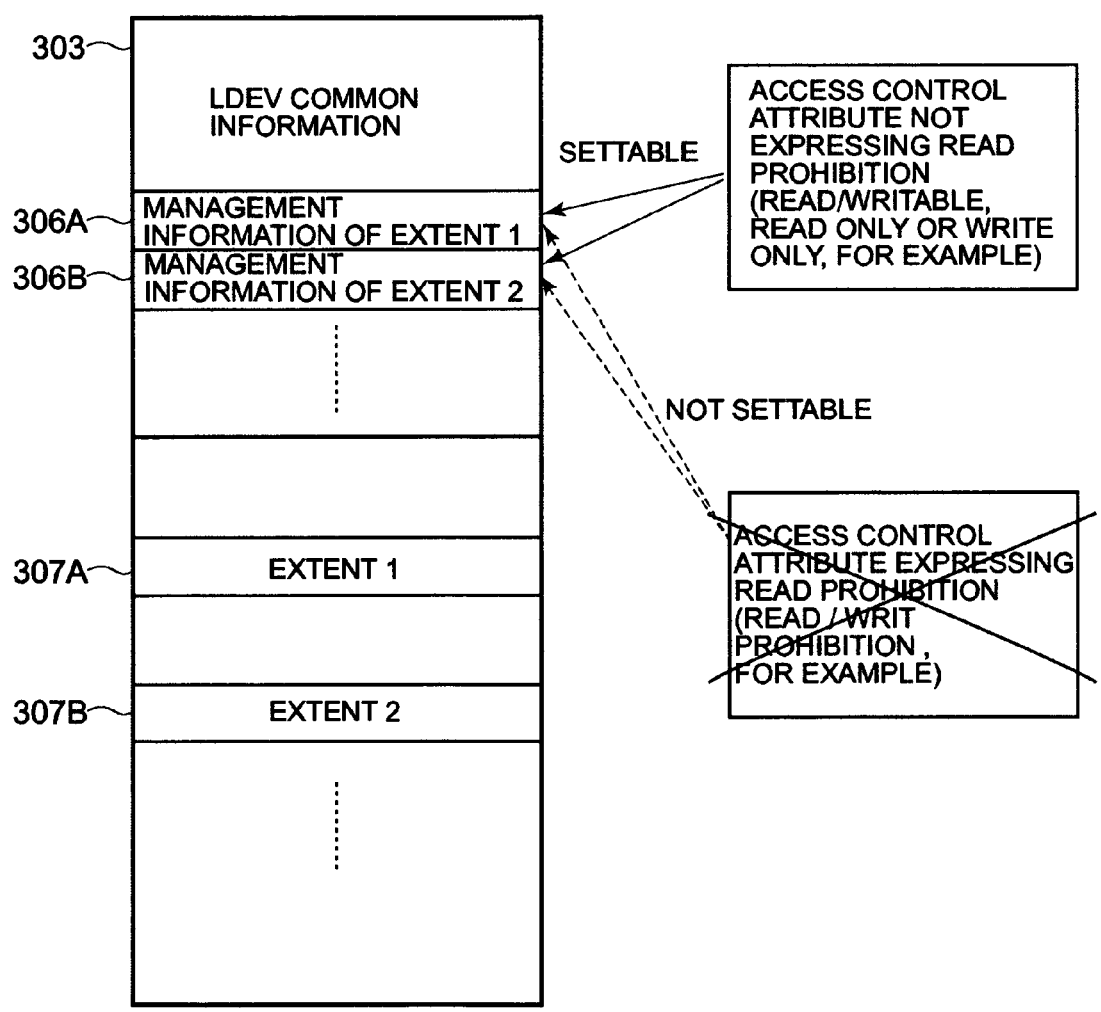
FIG. 8 is a conceptual view showing that an access control attribute expressing read prohibition is not set for any extent.

As illustrated by FIG. 8, this scheme consists in not establishing an access control attribute expressing read prohibition ('not read/writable', for example) for any extent. As a result, when a read request is received, the processor 144 need not judge whether a read prohibition limit applies to the extent where the read target data according to the read request is written ('read source extent' hereinbelow) and is able to read read-target data from the read source extent. This is because an access control attribute expressing read prohibition is not established for any extent in this example and, therefore, data can be read from any extent.

In this example, more specifically, read request processing is performed by means of the following process flow, for example.

Figure 7B:
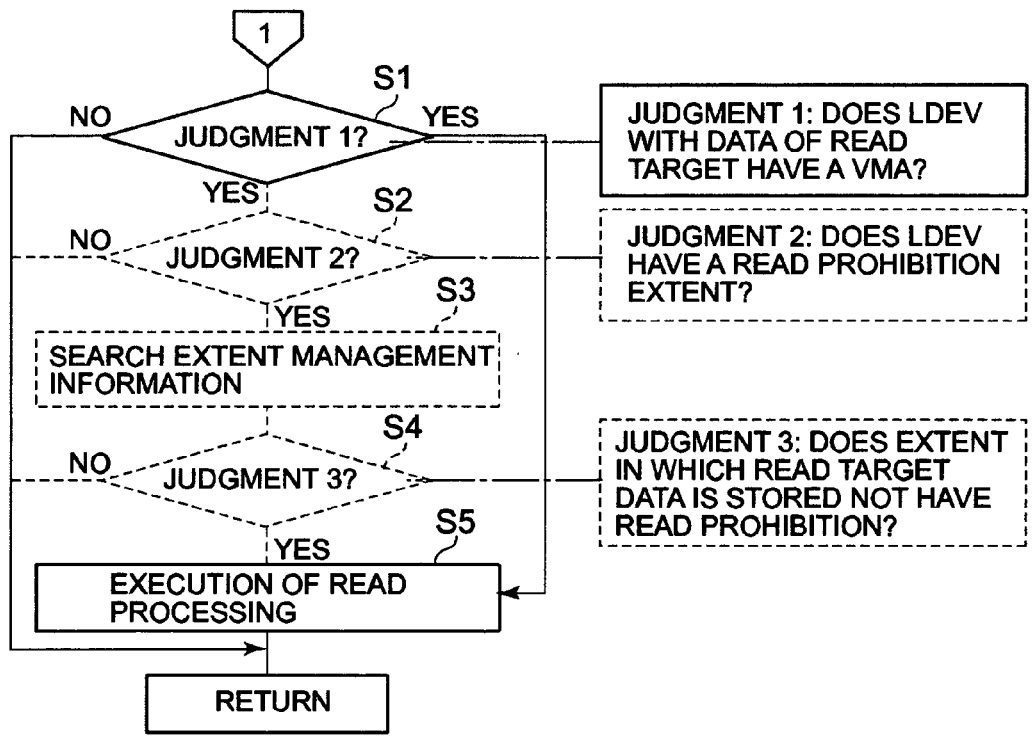
FIG. 7B illustrates the flow of read request processing that is performed when a read request is received by the host.

FIG. 7B illustrates the flow of read request processing that is performed when a read request is received by the host 110A.

Upon receiving a read request (a read command based on the SCSI protocol, for example) from the host 110A via the I/O portion 141, the processor 144 secures a cache segment (i.e. the cache area) for the cache memory 142.

The processor 144 judges whether the VMA 301 exists in the LDEV 226 carrying the read source extent (the read source LDEV hereinbelow) (S1). The judgment of S1 can be performed by means of the same method as the judgment of S11.

In cases where the judgment result that the VMA 301 exists in the read source LDEV 226 is obtained (Yes in S1), the processor 144 executes read processing (S5). More specifically, for example, the processor 144 reads read target data from the read source extent via the I/O portion 143, writes the read target data thus read to the cache segment secured above and reads read target data that has been written to the cache segment before transmitting the read target data thus read to the host 110A via the I/O portion 141.

Thus, in this example, because read prohibition has not been established in any extent, in the read request processing, read target data can be read from the read source extent without completely confirming the access control attribute of the read source extent. For this reason, in the read request processing, the processing of S2 to S4 (the processing indicated by the dotted line in FIG. 7B), which must be executed when there is a possibility that an access control attribute expressing read prohibition (not read/writable, for example) has been established, that is, processing such as the retrieval of extent management information, the referencing of access control attributes (processing like that in S12 to S14 in FIG. 7A) is not required. Consequently, the read request processing can be performed in a shorter time than at least the above write request processing.

Further, a few methods may be considered as the method that involves not establishing an access control attribute expressing read prohibition for any extent.

For example, there are methods that do not support, as an option, the access control attribute 'not read/writable' expressing read prohibition among the above four types of access control attributes 'read/writable', 'read only', 'write only' and 'not read/writable' (that is, methods that do not have a pre-prepared access control attribute expressing read prohibition).

Another method that may be considered is, for example, a method that establishes, for each LDEV, the type of data stored in the LDEV (in other words, establishes the type of LDEV) and which allows an access control attribute expressing read prohibition to be established for an extent in an LDEV when the type of data that is stored in the LDEV is of a different type from a predetermined type and, which does not establish an access control attribute expressing read prohibition for any extent in the LDEV when the type of data that is stored in the LDEV is of a predetermined type (a digital archive, for example). This method is able to execute a computer program (a program that is installed in the host 110A, the management terminal 130 or the maintenance terminal 122, for example) that receives settings for the extent 307, settings for the LDEV common information 303, and so forth, from the user, for example. The computer program judges whether the data type stored in the LDEV 226 is of a predetermined type from information that is inputted to the storage system 120A (the LDEV type that is inputted by the user or the attribute (identifier, for example) of a data file that is stored in the LDEV 226, for example), for example and, upon judging that the data type is of a predetermined type, does not selectively accept an access control attribute expressing read prohibition as the access control attribute that can be established for the extent 307 in the LDEV 226 (does not display the access control attribute on the display screen, for example).

A description of write request processing and read request processing was provided above.

Further, in the above write request processing and read request processing, the processor 144 is able to adjust the LBA of the access destination. For example, the processor 144 is able to render the internal LBA#m+k (m+k=110, for example), which is produced by adding an offset proportion #k based on the storage capacity of the VMA 301 (k=100, for example) when the access destination according to the access request (write request or read request) from the host 110A is the external LBA #m (m=0, for example), the access of the destination.

Further, in the case of the above write request processing and read request processing, the processor 144 is able to execute at least one of a plurality of patterns, for example, the following three patterns, as the method of referencing information that is written in the VMA 301.

(A) First Information Reference Pattern

The first information reference pattern is a pattern in which the processor 144 reads information from the VMA 301 of the LDEV 226 each time an access request is received and then stores the information thus read in the cache memory 142. Further, information thus read may be all the information that is written in the VMA 301 or may be the information that is referenced when the steps are executed (for example, in S12, only the information element 'write prohibition extent' in the LDEV common information 303 in the write destination LDEV).

(B) Second Information Reference Pattern

The second information reference pattern is a pattern that pre-stores, in the cache memory 142, information of at least a predetermined type in information that is written to the VMA 301 before receiving an access request. The stored information may be all the information that is written to the VMA 301 but is preferably information that is required for the judgments of S11 and S12 of the write request processing. This 'required information' is information that associates, for each LDEV, as illustrated in FIG. 9, for example, the LDEV number, the existence of the VMA (for example, a VMA identifier is written if the VMA exists) and the existence of a write prohibition extent. Here, for example, in cases where a write request is received from the host 110A, the processor 144 judges the existence of the VMA 301 by accessing the cache memory 142 and referencing the information element 'VMA existence' that corresponds with the LDEV number corresponding with the write request (S11) and, in cases where the VMA 301 is judged to exist, the processor 144 judges the existence of an extent for which write prohibition has been established by referencing the information element 'existence of write prohibition extent' that corresponds with the LDEV number (S12). Further, for example, upon receiving a read request from the host 110A, the processor 144 judges the existence of the VMA 301 by accessing the cache memory 142 and referencing the information element 'VMA existence' that corresponds with the LDEV number according to the read request (S1) and then executes the read processing when the VMA 301 is judged to exist (S5).

Further, 'extent existence' may also be stored in the cache memory 142 instead of or in addition to the information element 'existence of write prohibition extent' in FIG. 9. Here, the processor 144 executes the next step (executes the judgment of S12, for example) when an extent is judged to exist by referencing the information element 'extent existence' after the VMA is judged to exist. However, when, on the other hand, it is judged that no extent exists, the processor 144 may perform processing to write data to the user area 301, processing to read data from the user area 301, or predetermined error processing indicating that access is not possible (processing that instructs the user to establish an extent, for example).

Furthermore, the information element 'existence of read prohibition extent' may also be written in FIG. 9. As a result, when an access control attribute signifying a read prohibition area is established for the extent, a contribution to the shortening of the read request processing can be made.

(C) Third Information Reference Pattern

The third information reference pattern is a pattern that pre-stores, in the cache memory 142, information of at least a predetermined type among information of a plurality of types written in the VMA 301 before receiving an access request, judges which of the information of the plurality of types is information of a high priority, and thus retains information of a high priority in the cache memory 142 and discards information of a low priority from the cache memory 142.

The management information that is written in the VMA 301 is stored in the disk drive 121 via one or a plurality of cache segments secured in the cache memory 142 from the management terminal 130 or host 110A, for example. Therefore, in cases where a third information reference pattern is adopted, for example, the processor 144 performs processing to judge whether, for each cache segment with data that has been written to the disk drive 121, the cache segment may be discarded (known as 'cache-free judgment processing' hereinbelow) and retains only the information of high priority in the cache memory 142 as is.

Figure 10:
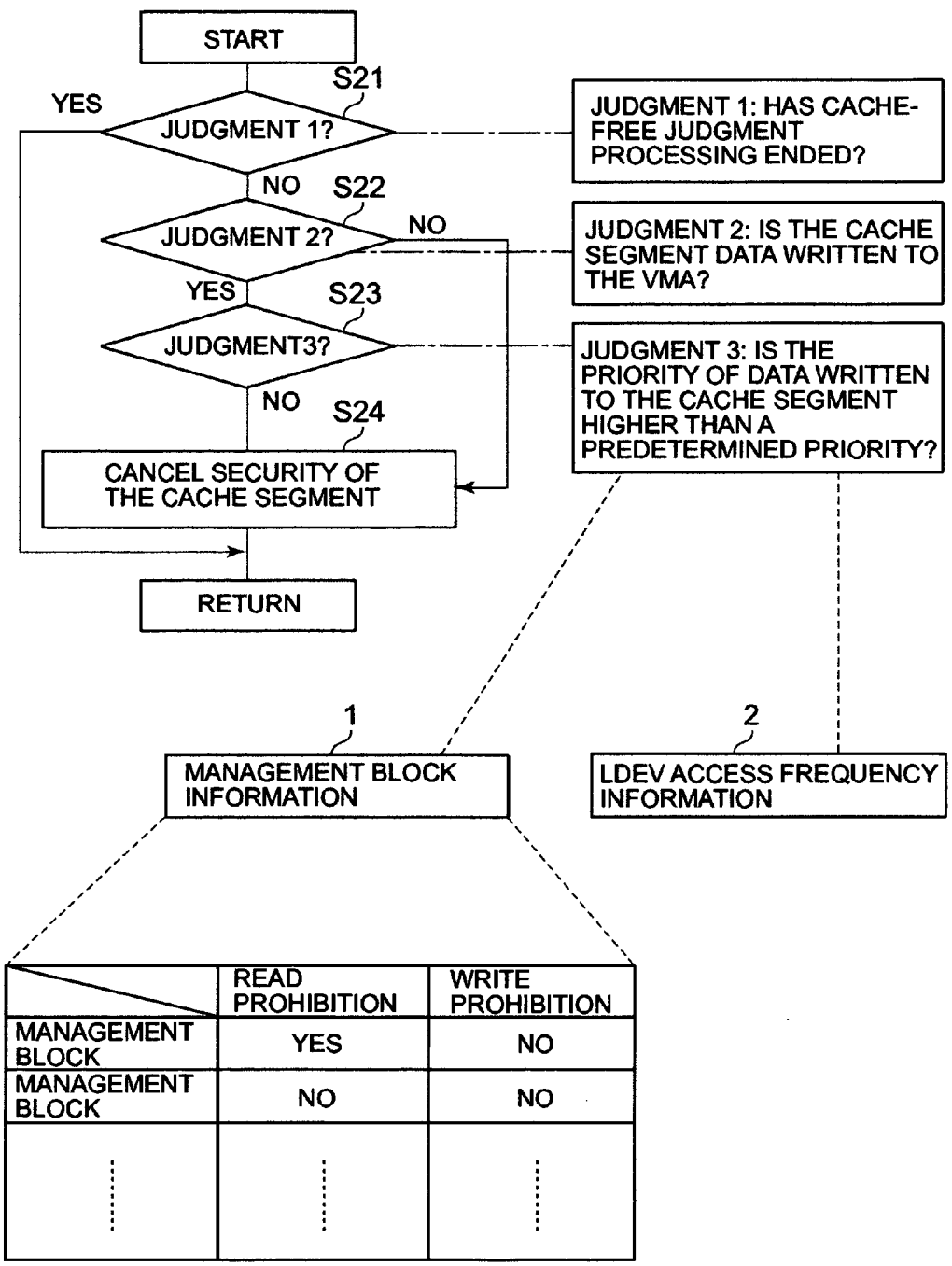
FIG. 10 shows an example of the flow of cache-free judgment processing.

FIG. 10 shows an example of the flow of cache-free judgment processing.

The processor 144 judges whether the cache memory constituting the target of the cache-free judgment processing (the 'cache segment' hereinbelow) has undergone cache free judgment processing (S21). For example, the processor 144 records cache management information that includes the ID of each cache segment and information indicating whether same has undergone processing to judge whether same is cache-free in the control memory 145 and is able to judge whether the cache segment has undergone cache-free judgment processing by referencing the cache management information.

In S21, when it is judged that the cache segment has not undergone cache-free judgment processing (No in S21), the processor 144 judges whether the data stored in the cache segment is data that has been written to the VMA 301 (S22). The processor 144 writes information expressing the relationship between information relating to the area of the VMA 301 (LBA, for example) and the ID of the cache segment in the cache memory 145, for example and, by referencing this information, is able to judge whether the data stored in the cache segment is data that has already been written to the VMA 301.

When it is judged in S22 that data that is stored in the cache segment is not data that has been written to the VMA 301 (data has been written to the user area 302 rather than the VMA 301 or written to the LDEV 226 carrying the VMA 301, for example (No in S22), the processor 144 cancels the security of the cache segment (S24). As a result, the data in the cache segment is discarded.

In a case where data that has been stored in the cache segment is judged to be data that is written to the VMA 301 (Yes in S22), the processor 144 judges whether the data written to the cache segment is of a higher priority than a predetermined priority (S23). When it is judged in S23 that the priority is low (No in S23), the processor 144 performs the processing of S24 and, when it is judged that the priority is high (Yes in S23), the processor 144 does not perform the processing of S24.

Here, 'information of a high priority type' is information that is referenced a large number of times (frequently, for example) in write request processing or read request processing and 'information of a low priority type' is information that is referenced a smaller number of times than 'information of a high priority type'. As a specific example of 'information of a high priority type', information that is referenced in S11 and S12 of write request processing, for example, can be cited. However, management block information 1 and/or LDEV access frequency information 2 can also be cited instead of or in addition to the foregoing information.

The management block information 1 is information that expresses the existence of write prohibition (or also the existence of read prohibition) for each of the management blocks 801 and, more specifically, it is information that is all or part of the information element 'management block information bitmap' in the LDEV common information 303, for example. As the grounds for being able to adopt the management block information 1 as 'information of a high priority type', the fact that, when it is specified that read prohibition or write prohibition has not been established for a certain management block 801, it is not necessary to reference the access control attribute especially in order to access this certain management block 801, may be cited. For example, in the judgment processing of S23, in cases where it is specified that the data stored in the cache segment is all or part of the management block 1 (in cases where it is specified that the data is data that has been written to an area for writing the management block information 1 of the VMA 301, for example), the processor 144 retains the data that has been written to the cache segment instead of discarding same.

The LDEV access frequency information 2 is information that expresses the access frequency of each LDEV 226. The LDEV access frequency information 2 is stored in the control memory 145, for example. The processor 144 updates the access frequency corresponding with the LDEV 226 each time the processor 144 accesses the respective LDEV 226. Further, in cases where it is specified in the judgment processing of S23 that the cache segment has data that has been written to the VMA 301 of the LDEV 226 with an access frequency that is smaller than a predetermined frequency, the processor 144 discards the data (S24) and, on the other hand, in cases where it is specified that this cache segment has data that has been written to the VMA 301 of the LDEV 226 with an access frequency that is equal to or more than a predetermined frequency, the processor 144 retains the data in the cache segment without discarding same. This judgment may be performed periodically. Further, once the data has been discarded, in cases where it is detected that the access frequency is equal to or more than a predetermined frequency, the processor 144 may read the 'information of a high priority type' from the VMA 301 of the LDEV 226 and store this information in the cache memory 142 and then retain the stored information in the cache memory 142 until the access frequency is once again smaller than the predetermined frequency.

Three patterns for referencing information has been written, to the VMA 301 were described above.

The VMA 301 is prepared in the LDEV 226 as mentioned earlier. Therefore, in cases where not an update of the management information group written in the VMA 301 is performed, data is exchanged between the management terminal 130, the maintenance terminal 122 or host 110A, and the disk drives 121 via the cache memory 142. As a method for updating the management information group in the VMA 301, a method that uses the update status and an update number as described subsequently can be adopted, for example.

When this method is adopted, the VMA update management information described subsequently is stored in a predetermined storage area, in the control memory 145, for example.

Figure 11:
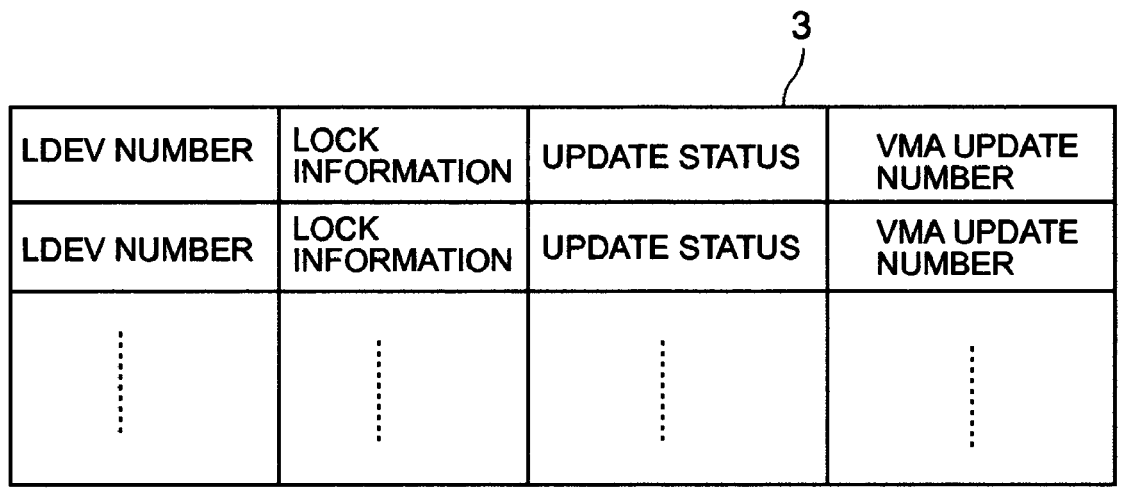
FIG. 11 shows a constitutional example of VMA update management information.

FIG. 11 shows a constitutional example of VMA update management information.

VMA update management information 3 is information for managing updates of the VMA 301 in the respective LDEV 226. The VMA update management information 3 includes, for example, for each of the LDEV 226, the LDEV number, lock information, the update status, and the VMA update number. The lock information is information expressing whether an LDEV is locked.

A description of VMA reference processing and of VMA update processing that employs the above VMA update management information 3 will be provided hereinbelow.

Figure 12:
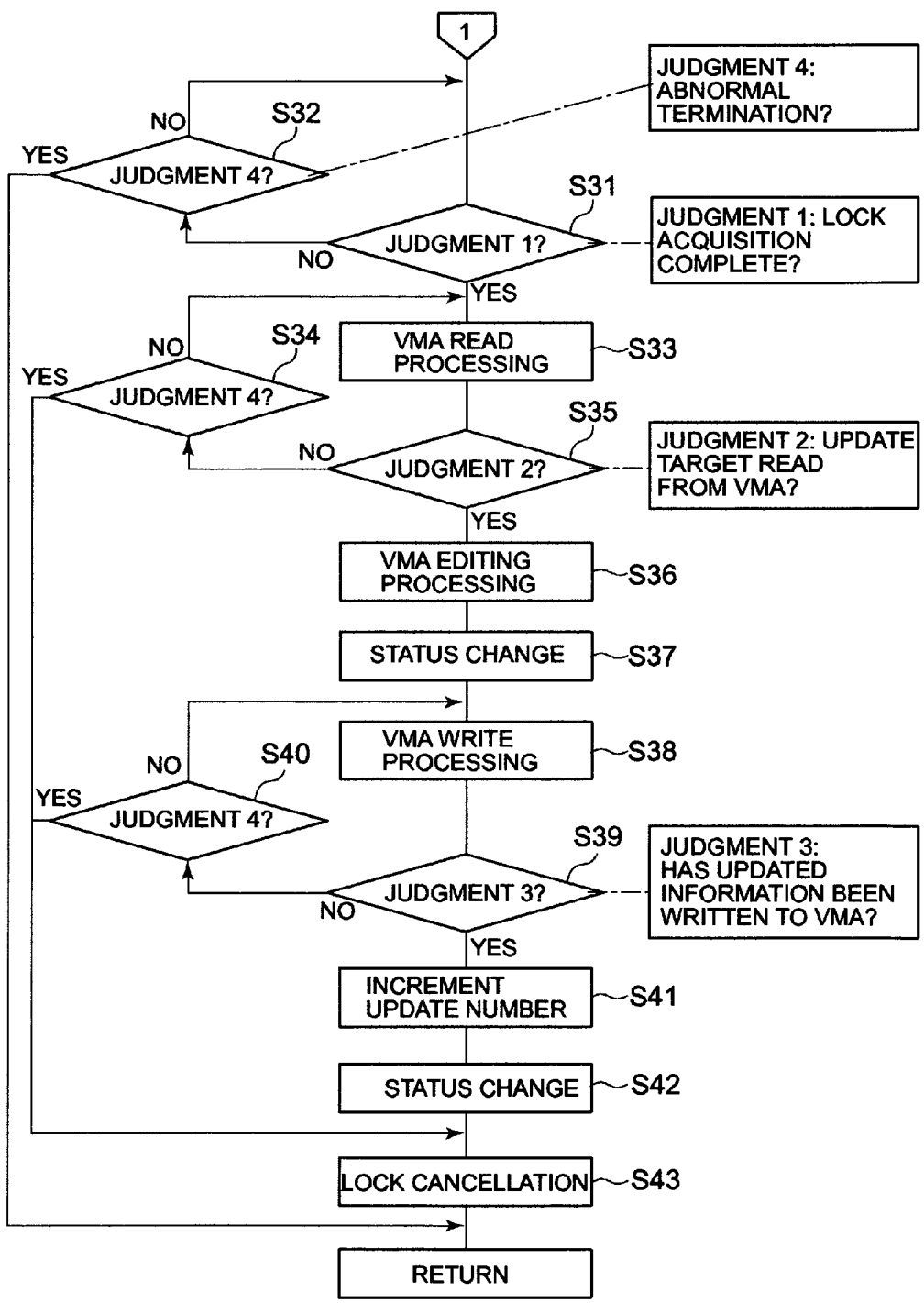
FIG. 12 shows an example of the flow of VMA update processing.

FIG. 12 shows an example of the flow of VMA update processing.

Upon receiving a request to update the VMA 301 of a certain LDEV 226, the processor 144 locks the LDEV 226 (S31). As a result, when a plurality of processors are installed in the storage system 120A, for example, it is possible to perform exclusive processing that prevents information in the certain LDEV 226 from being updated by means of a processor other than a locked processor 144. Further, in S31, for example, the processor 144 accesses the VMA update management information 3 and is able to lock the LDEV 226 by changing the lock information corresponding with the LDEV number of the LDEV 226 from 'unlocked' to 'locked'. In cases where the LDEV 226 cannot be locked (No in S31), the processor 144 attempts the processing of S31 unless an abnormal termination (timeout, for example) (Yes in S32) occurs.

If a lock has been applied (Yes in S31), the processor 144 reads at least the update target (all of the management information group or the LDEV common information 303, for example) from the VMA 301 of the locked LDEV 226 (S33). When it has not been possible to read the update target (No in S35), the processor 144 attempts the processing of S33 unless an abnormal termination (Yes in S34) occurs.

When an update target is read (Yes in S35), the update target is transmitted to the update request source (management terminal 130, maintenance terminal 122, or host 110A) by the processor 144 and the update target is edited by the update request source (S36). In S36, for example, the processor 144 may hold the update target thus read in the cache memory 142 and edit the update target of the cache memory 142 in response to information from the update request source (user operation result).

The processor 144 accesses the VMA update management information 3 when an update target is read and changes the update status of the LDEV 226 in which the update target is stored from 'no update' to 'update in progress' (S37).

The processor 144 writes an edited update target to the VMA 301 after changing the update status (S38). In S38, for example, the processor 144 overwrites the pre-editing update target with an edited update target. In cases where it has not been possible to write an edited update target (No in S39), the processor 144 attempts the processing of S38 unless an abnormal termination (Yes in S40) occurs.

In cases where an edited update target has been written (Yes in S39), the processor 144 accesses the VMA update management information 3 and increments the update number of the LDEV 226 where the update target is written by one (S41) and changes the update status of the LDEV 226 from 'update in progress' to 'no update' (S42). Further, the processor 144 cancels the lock on the LDEV 226 (changes the lock information of the LDEV 226 from 'locked' to 'unlocked', for example) (S43).

Figure 13:
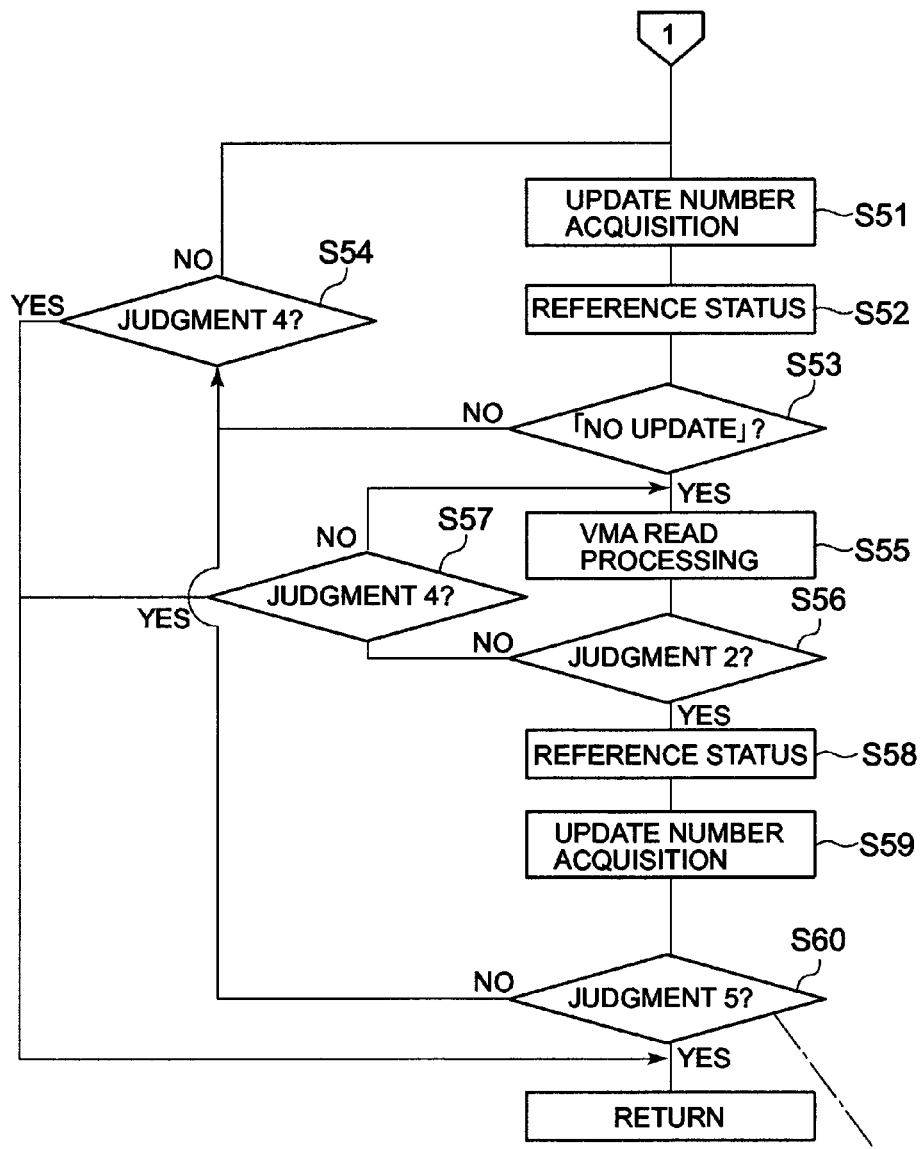
FIG. 13 shows an example of the flow of VMA reference processing in a case where the VMA update processing in FIG. 12 is performed.

FIG. 13 shows an example of the flow of VMA reference processing in a case where the VMA update processing in FIG. 12 is performed.

In cases where the processor 144 receives a read request to read the VMA 301 of a certain LDEV 226, the processor 144 acquires an update number corresponding with the LDEV 226 from the VMA update management information 3 (S51) and references the update status information corresponding with the LDEV 226 (S52).

If the update status is 'update in progress' (No in S53), S51 to S53 are repeated until Yes is obtained in S53 unless an abnormal termination (Yes in S54) occurs.

If the update status is 'no update', that is, if it is detected that the update status is not 'update in progress' (Yes in S53), the processor 144 reads information for which reading was requested that exists in the VMA 301 (edited update information, for example) (S55). In cases where the requested information has not been read (No in S56), the processor 144 attempts the processing of S55 unless an abnormal termination (Yes in S57) occurs.

When information is read from the VMA 301 (Yes in S56), the processor 144 performs the same processing as that of S51 and S52 (S58 and S59). The processor 144 judges whether two update numbers that are acquired both before and after reading information (that is, two update numbers that are acquired in S51 and S58) are the same as each other and whether update statuses that are referenced both before and after reading information (that is, update statuses that are acquired in S52 and S59) are not both 'update in progress' (S60). When an affirmative judgment result is obtained as a result of the judgment of S60, the processor 144 may transmit the information that is read in S55 to the read request source.

In the above update method, although an LDEV lock is not applied during VMA update processing, this lock can be a lock signifying both reading and writing with respect to the LDEV 226. However, thereupon, complete access to the LDEV 226 with the VMA 301 cannot be made during an update of the VMA 301.

As a method for eliminating this problem, the lock that is applied to the LDEV can be a lock signifying that writing is prohibited but reading is allowed. However, in this case, in the absence of a special scheme, the information that is read from the VMA 301 is pre-update information and this information is sometimes updated after being read.

Therefore, in this example, as described above, a method for ascertaining that the referenced information of the VMA 301 is information that has been accurately updated is prepared. An example of this method is a method that, as detailed earlier, ascertains whether the update numbers and update statuses are the same before and after the information is read from the VMA 301. By ascertaining whether the update numbers and update statuses are both the same before and after the information is read, the validity of the information that is read from the VMA 301 can be authenticated. This is because, if the update numbers are the same and the update statuses are different, for example, an update of the read information may be in progress and, if the update statuses are both 'no update' and the update numbers are different, a situation can arise where the old information prior to the update is read out.

Further, the information that is written to the VMA 301 can be seen from the display screen of the terminal that is connected to the storage system 120A (the management terminal 130, the maintenance terminal 122, or the host 110A, for example).

More specifically, for example, the processor 144 displays the LDEV common information 303 corresponding to all the LDEV installed in the storage system 120A as a list, as illustrated in FIG. 14A, for example. In this case, if the LDEV common information 303 of all the LDEV 226 are already stored in the control memory 145 or cache memory 142, the LDEV common information 303 is read without accessing the LDEV 226 especially and, therefore, the processor 144 is able to shorten the time taken to display the list.

Further, for example, because the extent management information 306 can be huge just counting the number of extent management information items that exist in one LDEV (approximately 60,000, for example), as illustrated in FIG. 14B, the processor 144 displays the extent management information of all the extents in one LDEV that is selected by the user from among a plurality of LDEV (a plurality of LDEV numbers displayed on a pull-down menu, for example) as a list. That is, the extent management information is displayed classified by the LDEV.

The host 110A is able to store data in the user area 302 but can also additionally establish the extent 307. Further, in addition, the host 110A can perform an update of information (extent management information 306, for example) that has been written to the VMA 301. The setting of the extent 307, the updating of information written to the VMA 301, and so forth, can be performed by means of a host resident program (the storage system control portion 212 in FIG. 2, for example) that is installed on the host 110A, for example.

More specifically, as illustrated by FIG. 15A, for example, the host resident program does not establish an extent at first but, when a subsequent time T2 (for example, the time at which a predetermined volume of data is reached or the time at which a predetermined period has elapsed from a certain time T1 (the time at which write target data is first written from a position at which an extent is not established, for example)) after time T1 is reached, the host resident program is able to newly establish a part that includes the area to which the data is written between times T1 and T2 as an extent. Further, in this case, the host resident program is such that the extent management information of an established extent can contain an access control attribute that allows the reading of data (read only, for example) (in other words, an access control attribute that prohibits reading is not established).

Further, for example, as shown in FIG. 15B, when an extent is established beforehand at an optional time T3 and a subsequent time T4 (the time at which data is applied to a lot of extents or the time after a predetermined period has elapsed from time T3, for example) is reached, a host resident program is able to include an access control attribute (read only, for example) that allows the reading of data in the extent management information for the extent that was established at time T3 (in other words, an access control attribute that prohibits reading is not established).

Figure 16A:
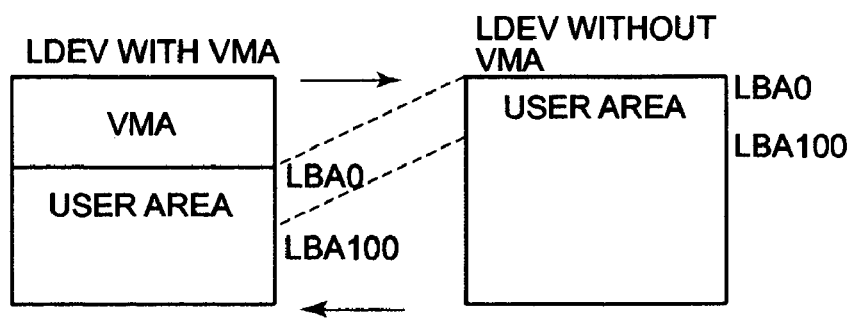
FIG. 16A shows an example of a shift in LBA as a result of VMA setting, deletion, and so forth.

The processor 144 of the storage system 120A is able to receive a VMA setting or cancellation request (a 'VMA setting/cancellation request' hereinbelow) for a certain LDEV 226 from a terminal that is operated by the user (the host 110A, management terminal 130 or maintenance terminal 122, for example) However, this does not necessarily mean that the VMA setting or cancellation may be performed in accordance with this request. This is because, as illustrated in FIG. 16A, when a VMA is cancelled from an LDEV with a VMA or a VMA is established in an LDEV without a VMA, the external LBA is shifted to the extent of the offset based on the storage capacity of the VMA. This is also because the constitution of the LDEV is broken.

Figure 16B:
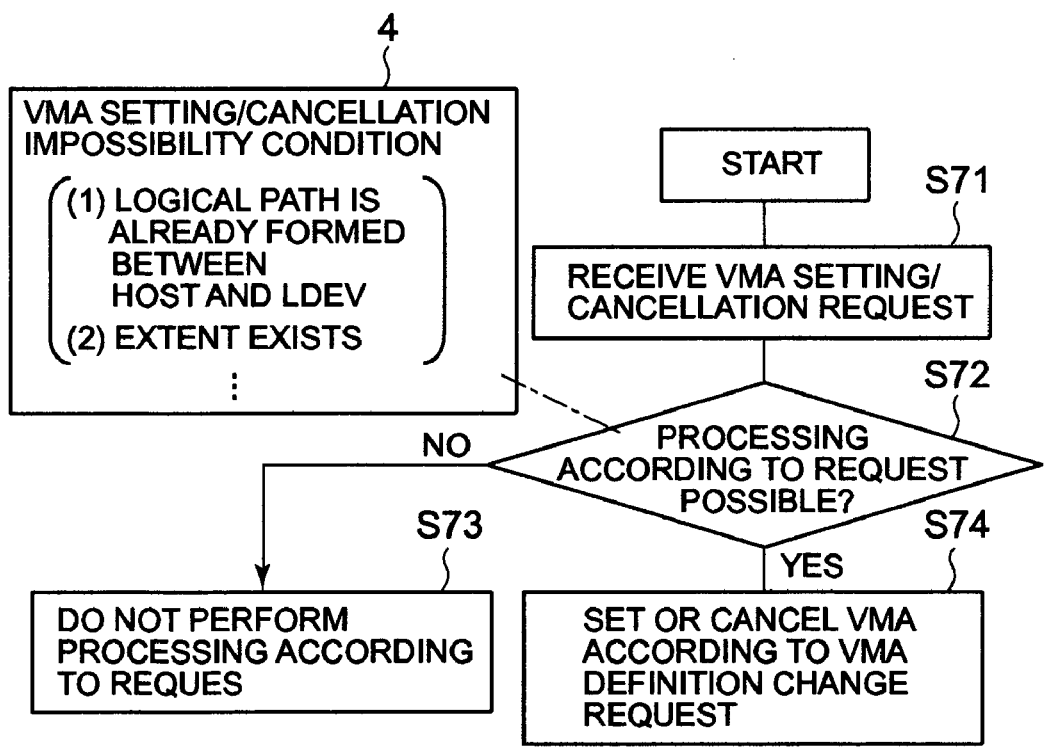
FIG. 16B shows an example of flow processing that is performed when a VMA setting/deletion request is received.

Therefore, the processor 144 is able to process a VMA setting/cancellation request by means of the processing illustrated in FIG. 16B.

Upon receiving a VMA setting/cancellation request (S71), the processor 144 references a VMA setting/cancellation impossibility condition 4 that is stored in a predetermined storage area (the control memory 145, for example) and judges whether the processing according to the VMA setting/cancellation request is possible (S72). The VMA setting/cancellation impossibility condition 4 includes conditions for cases where VMA setting and cancellation are impossible, i.e. includes the condition that a logical path is already formed between the host and LDEV and the condition that an extent exists, for example. In cases where there is a match with the conditions illustrated here, when VMA setting and cancellation are performed, a situation may arise where the host 110A accesses another area even when the host 110A is supposed to access a desired area (the header of the user area, for example).

As a result, when the LDEV constituting the target of the VMA setting/cancellation request matches the VMA setting/cancellation impossibility condition 4 (No in S72), the processor 144 does not perform processing according to a VMA setting/cancellation request (restores an error to the request source, for example) (S73) and, when there is no match with the VMA setting/cancellation impossibility condition 4 (Yes in S72), processing according to the VMA setting/cancellation request, that is, VMA setting or cancellation is performed (S74).

Accordingly, in cases where VMA setting and cancellation are performed for a certain LDEV, it is judged whether the host 110A is going to be unable to access the area in the LDEV by performing the VMA setting and cancellation and, when the judgment result that the host 110A will not be made to miss such access is obtained, the VMA setting and cancellation can be performed with respect to the certain LDEV.

EXAMPLE 2

The Second Example of the first embodiment of the present invention will be described hereinbelow. Further, in the following description, the differences from the first example will be mainly described, while a description of the points that are common to the first example will be omitted or simplified.

According to the first example above, specifically, the whole of the management information group is written to the VMA 301 that is prepared in the LDEV 226 and, if necessary, read to the cache memory 142. However, in the Second Example, instead of or in addition to this handling of the management information group, at least part of the management information group is stored in the control memory 145. Patterns of a plurality of types for storing at least part of the management information group in the control memory 145 that may be considered include the following three types of pattern (A) to (C).

(A) The whole of the management information group is stored in both the VMA 301 and the control memory 145.

(B) The whole of the management information group is stored in the VMA 301 but a predetermined part of the information in the management information group is stored in the control memory 145.

(C) A predetermined part of the information of the management information group is stored in the control memory 145 and the remaining information of the management information group is stored in the VMA 301.

Here, a 'predetermined part of the information' in (B) and (C) is information in the management information group that is referenced more frequently than the remaining information or information that is referenced at an earlier time than the remaining information by means of write request processing (see FIG. 7A) or read request processing (see FIG. 7B). In specific terms, for example, 'a predetermined part of the information' is the information illustrated in FIG. 9, that is, information that includes, for each LDEV, the LDEV number, the VMA identifier in the LDEV common information 303 (in other words, the existence of a VMA), and the existence of a write prohibition extent (or, additionally, the existence of a read prohibition extent). Thus, for example, S11 and S12 of the write request processing can be executed by accessing the control memory 145 and there is no need to access the LDEV 226 especially. Therefore, a shortening of the time for the write request processing is feasible.

Further, in the above patterns (B) and (C), if, in the write request processing, processing advances as far as S14 (also in read request processing in cases where an access control attribute relating to read prohibition has been established (when there is a read prohibition extent, for example)), because the information stored in the control memory 145 alone is insufficient, the processor 144 must read information from the VMA 301 of the LDEV 226 to the cache memory 142.

Figure 17A:
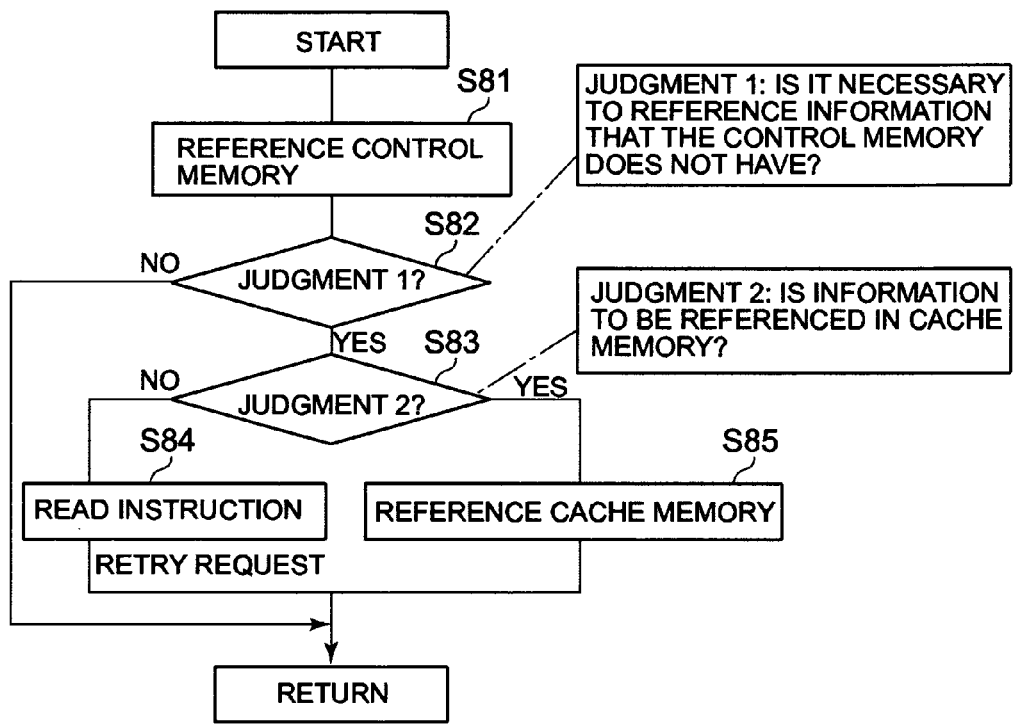
FIG. 17A shows an example of the flow of processing that is performed when a certain information element in a management information group is read in a Second Example of the first embodiment of the present invention.

FIG. 17A shows an example of the flow of processing that is performed when a certain information element in a management information group is read. Further, in the following description, the area in which the above 'predetermined part of information' of the control memory 145 is stored is referred to for the sake of expedience as the 'subVMA'.

In cases where a read request to read an information element in the management information group is received, the processor 144 references the subVMA of the control memory 141 (S81). In cases where it is judged that an information element constituting a read request target does not exist in the subVMA (Yes in S82), the processor 144 judges whether the information element has been read to the cache memory (S83).

When it is judged that the information element has not been read to the cache memory (No in S83), the processor 144 issues an instruction to read the information element from the VMA 301 to the cache memory 142 and, by issuing a command such as a 'retry request' without waiting in this case, performs the processing of S81 once again. On the other hand, when it is judged that the information element has been read to the cache memory (Yes in S83), the processor 144 accesses the cache memory 142 and references the information element (S85).

Figure 17B:
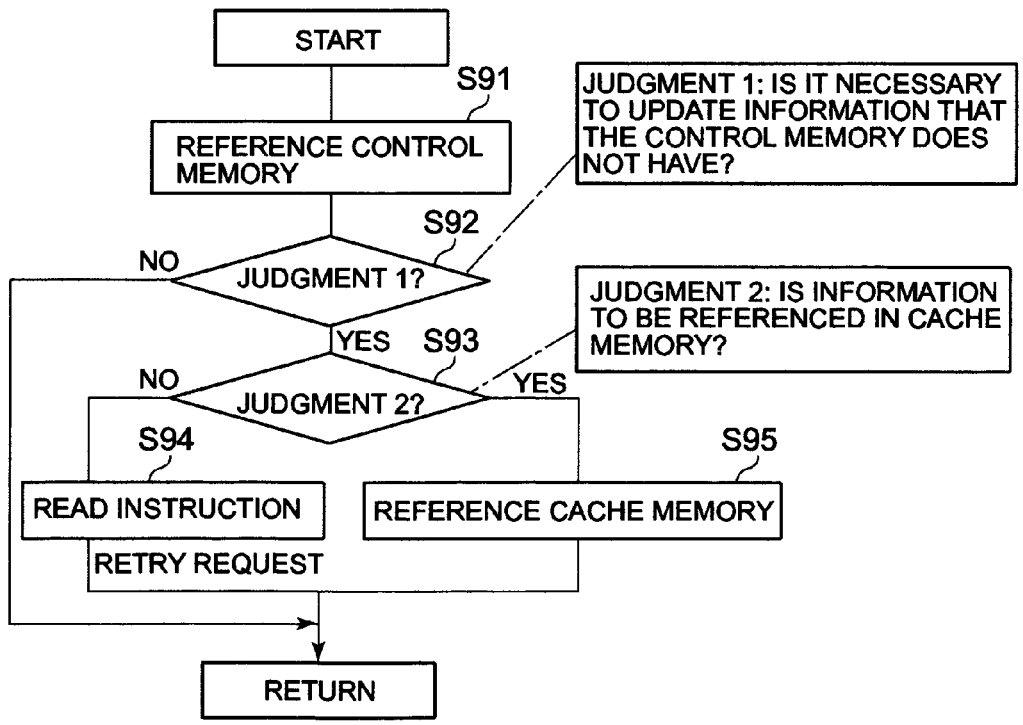
FIG. 17B shows an example of the flow of processing that is performed when a certain information element in a management information group is updated.

FIG. 17B shows an example of the flow of processing that is performed when a certain information element in a management information group is updated.

This processing is substantially the same as the processing of FIG. 17A above. That is, the processor 144 references the subVMA of the control memory 141 in cases where an update request to update an information element in the management information group is received (S91) and, in cases where it is judged that the information element constituting the update request target does not exist in the subVMA (Yes in S92), judges whether the information element has been read to the cache memory (S93). Thereafter, S84 or S85 is performed (S94 or S95).

Further, the process flow shown in FIGS. 17A and 17B is an example and there is no need to limit the processing to this process flow. For example, VMA management information that indicates what kind of information element in the management information exists in the VMA 301 and what kind of information element exists in the subVMA is stored in the control memory 144 and, by referencing the VMA management information, the processor 144 may judge in which of the subVMA and VMA 301 an information element constituting a read target or update target exists and may perform processing in accordance with the judgment result.

EXAMPLE 3

The Third Example of the first embodiment of the present invention will now be described hereinbelow.

In the Third Example, as illustrated in FIG. 18A, in addition to the mounted LDEV that actually have storage areas in the disk drives 121, a virtual LDEV 226V without a storage area in the disk drives 121 exists in the storage system 110A and the virtual LDEV 226V is associated with an LDEV ('external LDEV' hereinbelow) 226R that exists in an external storage system 120B. The LDEV group management information 223 (see FIG. 2) includes, for example, for each LDEV 226, information indicating whether an LDEV is a real LDEV or a virtual LDEV and information for identifying an external LDEV that is associated with the virtual LDEV in the case of a virtual LDEV (the ID of the storage system comprising the external LDEV, the LDEV number of the external LDEV, for example).

In this case, upon receipt of an access request from the host 110A (read request, for example), in cases where the fact that the access destination indicated by the access request (the LDEV number, for example) is a virtual LDEV 226V is specified by the LDEV group management information 223, the processor 144 of the storage system 120A accesses the external LDEV 226R corresponding with the virtual LDEV 226V (reads data from the external LDEV and transmits the data thus read to the host 110A, for example).

In the case of the Third Example, the VMA identifier is recorded in a predetermined position (header, for example) of the VMA 301 and the VMA type can be identified from the VMA identifier. As an example of the arrangement, for example, information expressing an association between the VMA identifier and VMA type illustrated in FIG. 18B is integrated into a computer program that is read to the processor 144 and this computer program may identify the VMA type from the VMA identifier in the course of predetermined judgment processing. Further, for example, the information illustrated in FIG. 18B is stored in a predetermined storage area such as the control memory 145 and, by referencing this information with the VMA identifier serving as the search key, the processor 144 may retrieve the VMA type corresponding with the VMA identifier.

Accordingly, in the Third Example, the arrangement illustrated in FIG. 18C, for example, can be implemented. That is, for example, when the external LDEV 226R is associated with the virtual LDEV 226V (S101), the processor 144 is able to reflect the VMA identifier in the virtual LDEV 226V by reading the VMA identifier from the associated external LDEV 226R, in other words, identify the VMA type of the virtual LDEV 226V. Further, also in cases where the virtual LDEV 226V is associated once again with the external LDEV 226R after the association has been canceled (S103), the processor 144 is able to reflect the VMA identifier in the virtual LDEV 226V by reading the VMA identifier from the associated external LDEV 226R. Similarly, so too when another virtual LDEV is associated with the external LDEV 226R (S104), the processor 144 is able to reflect the VMA identifier in another virtual LDEV by reading the VMA identifier from the associated external LDEV 226R.

EXAMPLE 4

A Fourth Example of the first embodiment of the present invention will be described hereinbelow.

In the Fourth Example, data is copied from a primary LDEV 226P to a secondary LDEV 226S. In this case, the LDEV group management information 223 of the storage system 120A may also include, for example, for each LDEV 226, when an LDEV constituting a pair partner exists, a storage system ID (a number, IP address or WWN (World Wide Name), for example) for identifying the storage system 120B that comprises the LDEV of the pair partner, the LDEV number of the LDEV 226S of the pair partner and information indicating whether the LDEV itself is a primary LDEV or a secondary LDEV.

Figure 19A:
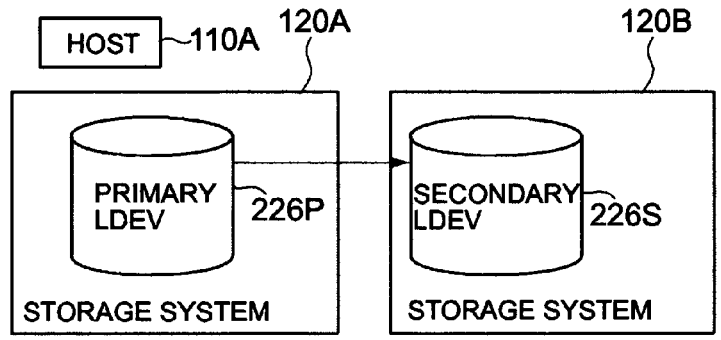
FIG. 19A is an explanatory view of a so-called remote copying of a fourth example of the first embodiment of the present invention.

Here, in cases where the fact that the LDEV itself is a primary LDEV and the pair partner is a secondary LDEV and the LDEVs constituting the pair exist in the same storage system 120A is specified by the LDEV group management information 223, the secondary LDEV can be rendered a duplicate of the primary LDEV as a result of data that exists in the primary LDEV being read by the processor 144 and the data thus read being stored in the secondary LDEV. Furthermore, in cases where the fact that the LDEV itself is a primary LDEV that exists in the storage system 120A and the pair partner is a secondary LDEV that exists in another storage system 120B is specified by the LDEV group management information 223, the secondary LDEV 226S can be rendered a duplicate of the primary LDEV 226P as a result of the data that exists in the primary LDEV 226P being read by the processor 144 and the data thus read being stored in the secondary LDEV 226S in the storage system 120B as illustrated in FIG. 19A (that is, by performing so-called remote copying).

Figure 19B:
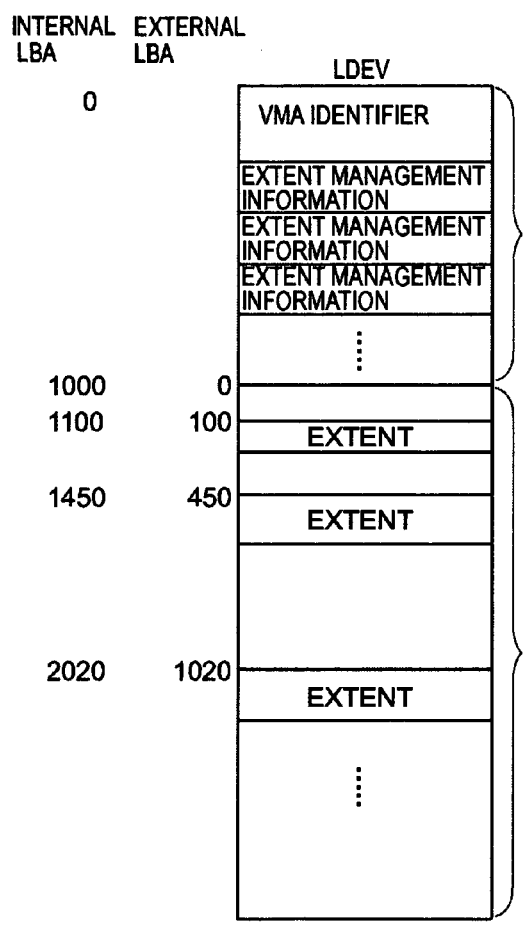
FIG. 19B is an explanatory view of a first LBA management system.
Figure 19C:
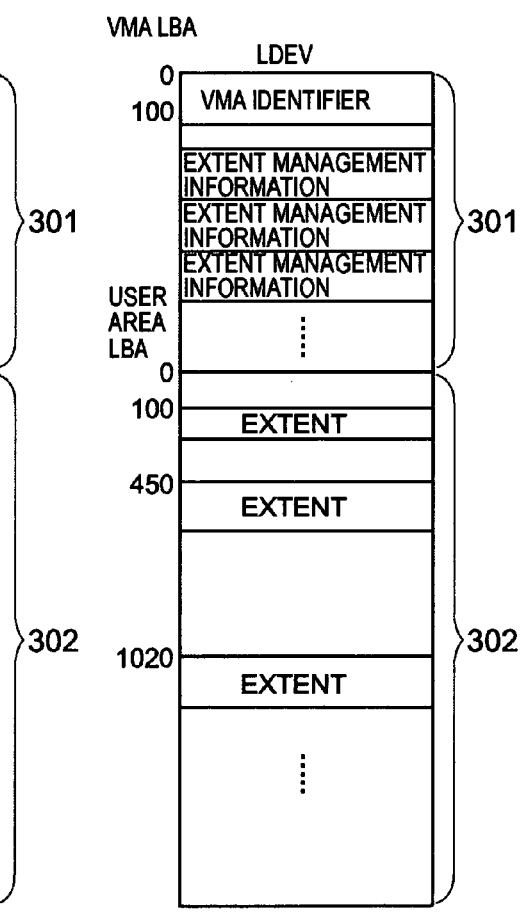
FIG. 19C is an explanatory view of a second LBA management system.

In the Fourth Example, an LBA management system shown in at least one of FIGS. 19B and 19C can be adopted.

The first LBA management system illustrated in FIG. 19B is a system that prepares the internal LBA and external LBA that were described in the First Example. According to the first LBA management system, for example, in cases where an access request is received from the host 110A, the storage system 120B is able to cause the host 110A to access the requested location by accessing the external LBA of the LBA according to the access request. Furthermore, according to the first LBA management system, for example, in cases where an access request (remote copy request, for example) is received from the storage system 120A, the storage system 120B is able to cause the storage system 120A to access the requested location by accessing the internal LBA of the LBA according to the access request. In this case, the storage system 120A is able to access the desired location by issuing an access request that designates an LBA rendered by adding an offset (1000, for example) based on the storage capacity of the VMA 301 when the user area 302 of the secondary LDEV 226S is accessed, for example.

The second LBA management system that is illustrated in FIG. 19C is a system that prepares the VMA LBA and the user area LBA. In this case, when the storage system 120A accesses the user area of the LDEV of the storage system 120B, for example, even without considering the above offset, if the fact that the access destination is the user area is communicated to the storage system 120B in addition to the LBA, the storage system 120B (the processor installed in the storage system 120B, for example) is able to cause the storage system 120A to access a desired location (the communicated LBA) of the user area of the secondary LDEV 226S. Further, in this system, for example, upon receiving an access request from the host 110A, the storage systems 120A and 120B are both able to cause the host 110A to access the location desired by the host (the LBA designated by the host 110A, for example) by always permitting access in accordance with the user area LBA. Further, for example, upon receiving information indicating which of the VMA and user area to access from an access request source (the storage system 120A or host 110A, for example), the storage system 120B is able to allow access to the access request source by using the LBA according to this information. Further, for example, after receiving a command to access a first area (user area or VMA) from the access request source, the storage system 120B is also able to always allow the access request source to access the first area LBA until a command to access a second area (VMA or user area) that is separate from the first area is received.

The storage capacities of the primary LDEV and secondary LDEV are the same, for example. In the Fourth Example, the following copy control can be performed, for example. Although the above remote copy is described by way of example below, the copy control can also be applied to the control of copying from a primary LDEV to a secondary LDEV in the same storage system. Further, copying from the primary LDEV to the secondary LDEV can be performed by means of a write request from the primary storage system to the secondary storage system and by means of a read request from the secondary storage system to the primary storage system. However, in the following description, the former write request case is taken by way of example.

Figure 20A:
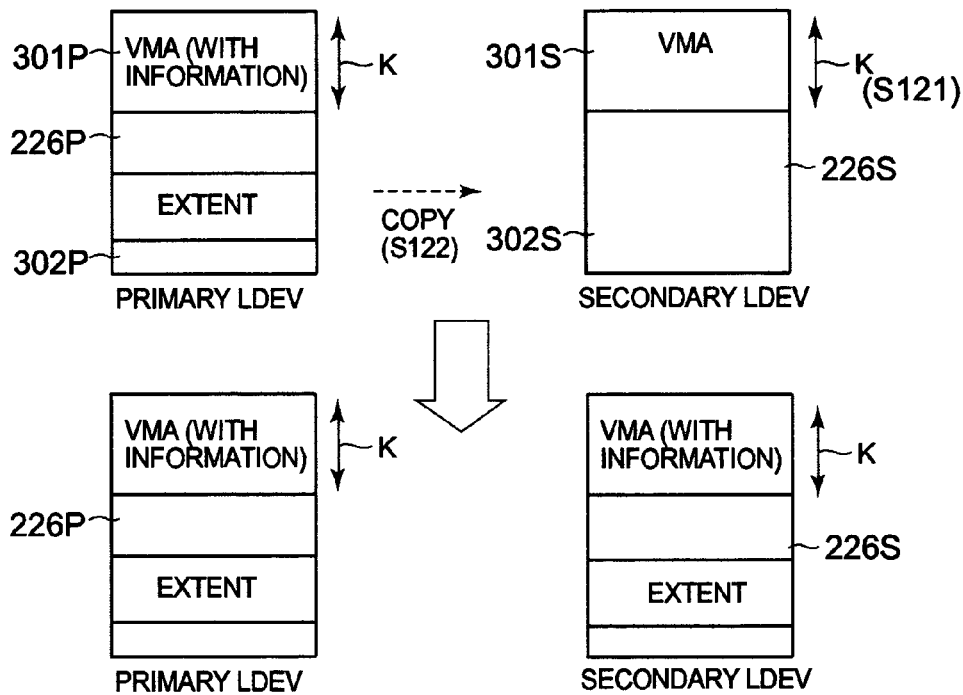
FIG. 20A is an explanatory view of first copy control.

FIG. 20A is an explanatory view of first copy control. Further, the processor 144 of the storage system 120A is referred to as the 'first processor' and the processor of the storage system 120B is referred to as the 'second processor'.

Suppose that the primary LDEV 226P has a VMA301P where LDEV common information 303 and so forth is stored and a user area 301P where at least one extent is established. On the other hand, the secondary LDEV 226S is in an unoccupied state with no information or area established therein.

In this state, the second processor of the storage system 120B receives a VMA setting request from the user operation terminal (the management terminal 130, maintenance terminal 122 or host 110A, for example), which is a terminal operated by the user and, in accordance with this request, as shown at the top of FIG. 20A, a VMA 301S with a capacity K that is the same as the storage capacity K of a VMA 301P of the primary LDEV 226P is established in the secondary LDEV 226S (S121) As a result, the secondary LDEV 226S is divided up into the VMA 301S and the user area 302S. Further, here, the arrangement of the LBA of the secondary LDEV 226S can be the same as the arrangement of the LBA of the primary LDEV 226 in accordance with information that is inputted from the user operation terminal, for example. Further, the setting of the VMA 301S can be performed at the same time as the LDEV pair is formed between the primary LDEV 226P and the secondary LDEV 226S, for example. The setting of this VMA 301S may be performed manually or may be performed automatically. When performed automatically, for example, the second processor is able to establish the VMA 301S with the same size in the same position as the VMA 301P in the secondary LDEV 226S on the basis of the VMA size in the LDEV common information of the primary LDEV 226P.

The first processor of the storage system 120A issues a request to the storage system 120B to write all the information in the primary LDEV 226 in the secondary LDEV 226S with optional timing (for example, in response to a copy request from the user operation terminal) (S122). As a result, the second processor of the storage system 120B writes all the information in the primary LDEV 226 in the secondary LDEV 226S via the cache memory in response to the request.

As a result of the above processing, as shown at the bottom of FIG. 20A, the secondary LDEV 226S is a duplicate of the primary LDEV 226P. That is, for example, in the same location as the extents in the user area 301P of the primary LDEV 226P, the same extents as these extents are established in the user area 302S of the secondary LDEV 226S and all the information in the VMA 301P of the primary LDEV 226P is written to the VMA 301S of the secondary LDEV 226S. As a result, the access control attributes that have been established for the respective extents of the primary LDEV 226P can be handed over to the respective extents of the copy-destination secondary LDEV 226S.

In accordance with this first copy control, even when copying takes place from the primary LDEV 226P to the secondary LDEV 226S, because the VMA 301S is established beforehand, copying can be performed without producing an LBA offset.

Figure 20B:
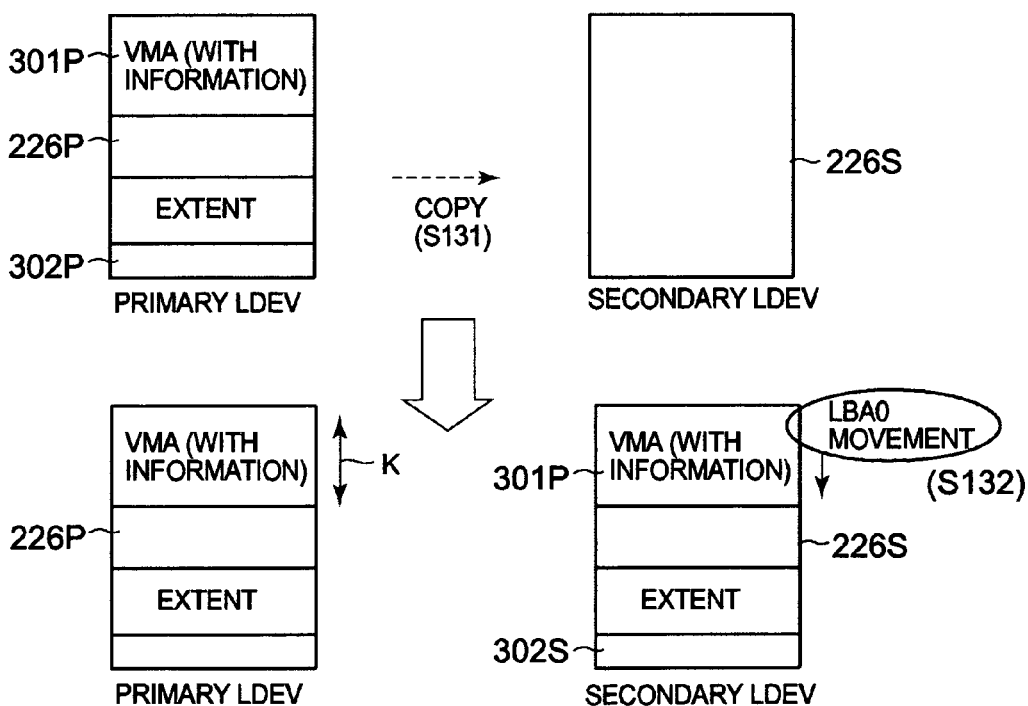
FIG. 20B is an explanatory view of second copy control.

FIG. 20B is an explanatory view of second copy control.

The primary LDEV 226P has a VMA 301P where LDEV common information 303 and so forth is stored and a user area 301P in which at least one extent is established. On the other hand, the secondary LDEV 226S is in an unoccupied state with no information or area established therein.

In this state, the first processor of the storage system 120A issues a request to the storage system 120B to write all the information in the primary LDEV 226 to the secondary LDEV 226S as shown at the bottom of FIG. 20B with optional timing (for example, in response to a copy request from the user operation terminal) (S131). As a result, the secondary processor of the storage system 120B writes all the information in the primary LDEV 226 to the secondary LDEV 226S via the cache memory in response to this request.

As a result of this processing, as shown at the bottom of FIG. 20B, the secondary LDEV 226S is a duplicate of the primary LDEV 226P. That is, for example, in the same location as the extents in the user area 301P of the secondary LDEV 226S, the same extents as these extents are established in the user area 302S of the secondary LDEV 226S and all the information in the VMA 301P of the primary LDEV 226P is written to the VMA 301S of the secondary LDEV 226S. As a result, the access control attributes that have been established for the respective extents of the primary LDEV 226P can be handed over to the respective extents of the copy-destination secondary LDEV 226S. Further, when a VMA 301S with a storage capacity K that is the same as that of the primary LDEV 226P is established in the secondary LDEV 226S, if the first LBA management system is adopted, the second processor (or first processor) lowers the external LBA0 of the secondary LDEV 226S by an offset that is based on the storage capacity K of the VMA 301S (establishes a position at the header of the user area 301S) as shown at the bottom of FIG. 20B. Further, although not illustrated, if the second LBA management system is adopted when the VMA 301S, which has the same storage capacity K as the primary LDEV 226P, is established, the second processor (or first processor) is able to prepare the VMA LBA and user area LBA in the secondary LDEV 226S.

With the second copy control, the advantage that the VMA 301S is not established beforehand in the secondary LDEV 226S can be obtained.

Figure 21:
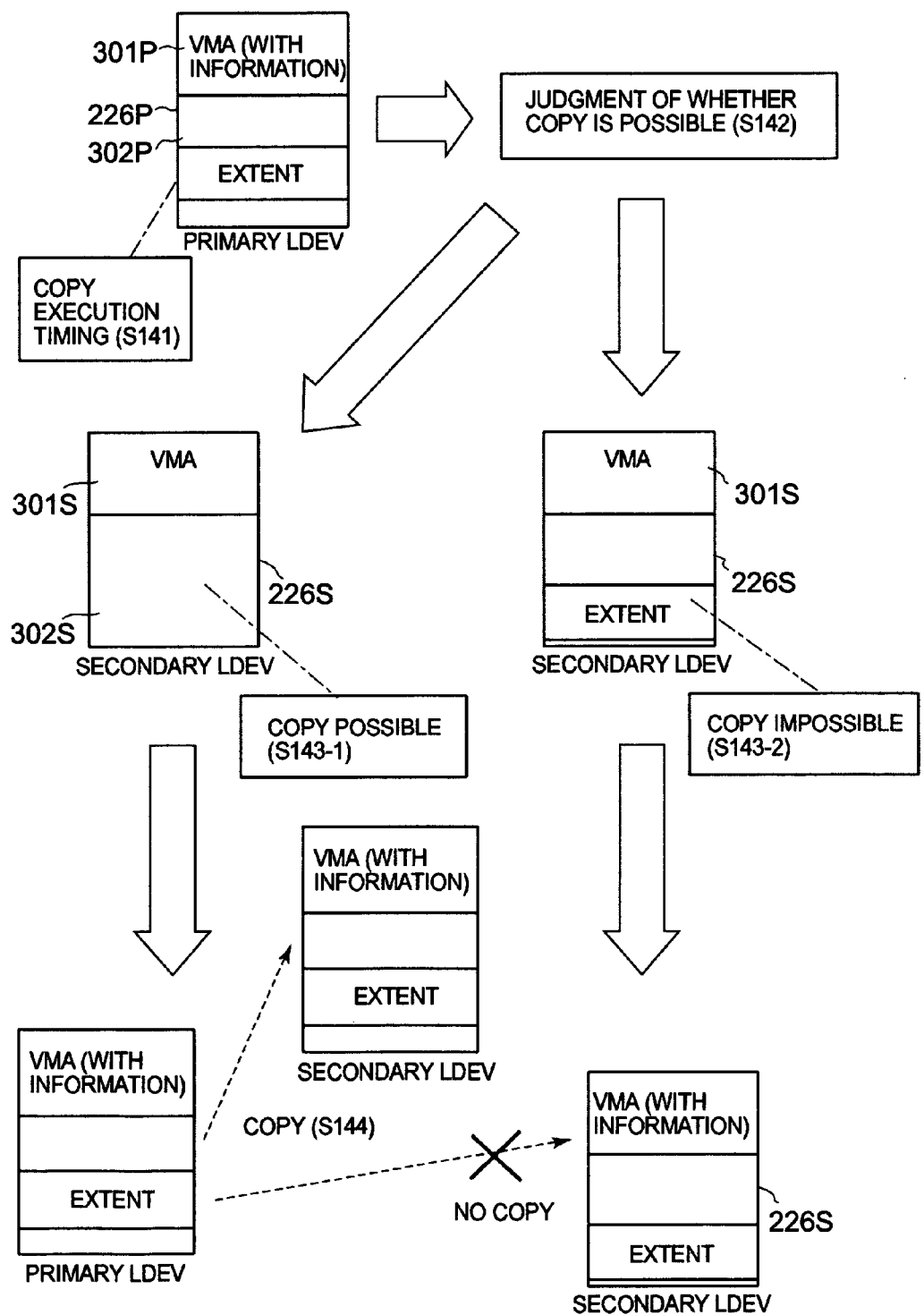
FIG. 21 is an explanatory view of third copy control.

FIG. 21 is an explanatory view of third copy control.

The primary LDEV 226P has a VMA 301P where LDEV common information 303 or the like is stored and a user area 301P in which at least one extent is established. On the other hand, at least a VMA 301S with the same storage capacity as the VMA 301P is established in the secondary LDEV 226S.

In this state, the first processor of the storage system 120A judges whether copying is possible at the copy execution time (for example, when a copy request from the user operation terminal is received) (S141) (S142). More specifically, for example, the first processor acquires at least the information element 'extent existence' from VMA 301S and judges whether the extent exists in the secondary LDEV 226S from the information element 'extent existence'. In cases where it is judged that an extent exists, it is judged that copying is impossible and, in cases where it is judged that an extent does not exist, it is judged that copying is possible. Irrespective of whether an extent exists in the secondary LDEV 226S, when all the information in the primary LDEV 226P is copied to the secondary LDEV 226S, the constitution of the secondary LDEV 226S changes. Further, the VMA setting/cancellation impossibility condition described with reference to FIG. 16B, for example, may be adopted as the judgment standard of whether copying is possible. That is, when the secondary LDEV 226S is identified to the host, it may be judged that copying is impossible and, when the secondary LDEV 226S is not identified to the host, it may be judged that copying is possible.

When it is judged in S142 that copying is possible (when it is judged that one extent does not exist in the secondary LDEV 226S, for example) (S143-1), the first processor copies the information in the primary LDEV 226P to the secondary LDEV 226S.

On the other hand, when it is judged in S142 that copying is impossible (when it is judged that an extent exists in the secondary LDEV 226S, for example) (S143-2), the first processor does not copy information in the primary LDEV 226P to the secondary LDEV 226S. As a result, the current constitution of the secondary LDEV 226S may be preserved.

The Fourth Example was described above. In the case of the Fourth Example, information in the primary LDEV is copied to the secondary LDEV. As a result, the extent and the access control attribute that is established for the extent are handed over from the primary LDEV to the secondary LDEV and the information in each extent in the copy-destination secondary LDEV can be protected in the same manner as the information in each extent of the primary LDEV.

Furthermore, in the case of the Fourth Example, the technology disclosed in Japanese Patent Application No. 2004-079119 (U.S. patent application Ser. No. 10/844,482: not yet published at the time of this application) can be suitably claimed.

A few preferred modified examples of the present invention were described hereinabove. However, these are illustrative examples that serve to explain the present invention and are not intended to limit the scope of the present invention to these embodiments. The present invention can be implemented in a variety of other forms. For example, the processor 144 may be provided in both the I/O portion 141 and the I/O portion 143 and the control memory 145 may be shared by a plurality of processors. Further, the write request processing and read request processing and so forth may be performed by the processor 144 that is installed in the host-side I/O portion 141. In addition, at least one of the data copy source and copy destination be magnetic tape.

What is claimed is:

1. A data processing system that is connected to a communication device, comprising:
   at least one computer;
   a program storage area that stores at least one computer program that is read by the at least one computer;
   a storage device that comprises a plurality of extents constituting subareas that are able to store data; and
   an attribute storage area for storing a plurality of access control attributes corresponding with the plurality of extents,
   wherein the access control attributes corresponding with the extents are access control attributes of a type that is selected from among a plurality of types of access control attributes;
   the plurality of types of access control attributes do not include an access control attribute signifying read prohibition but include an access control attribute signifying write permission, an access control attribute signifying read permission, and an access control attribute signifying write prohibition; and
   the at least one computer that reads the at least one computer program retrieves, when a write request is received from a communication device that transmits write target data and the write request, an access control attribute of a write-destination extent according to the write request from among the plurality of access control attributes, judges whether the access control attribute thus retrieved is an access control attribute signifying write prohibition, and controls whether the write target data is written to the write destination extent in accordance with the result of the judgment; and,
   when a read request for read target data is received from a communication device that transmits the read request, reads the read target data from a read source extent without retrieving the access control attribute of the read source extent according to the read request from among the plurality of access control attributes.

2. The data processing system according to claim 1, wherein the at least one computer executes the processing of (1) or (2) below in response to a request from the communication device:
   (1) processing that renders an area, which includes an area having at least one write target data item that is written to the storage device between a first time and a second time, one extent, and stores the access control attribute for the extent in the attribute storage area;
   (2) processing that establishes one extent at a first time, and stores in the attribute storage area an access control attribute for the extent thus set at a second time after write target data has been stored in the extent thus established.

3. A data processing system that is connected to a communication device, comprising:
   at least one computer;
   a program storage area that stores at least one computer program that is read by the at least one computer;
   a plurality of storage devices that store data;
   a plurality of extents provided in at least one storage device of the plurality of storage devices;
   a cache memory area that temporarily stores data that is exchanged between the storage devices and the communication device;
   a control memory area that stores information for controlling the exchange of the data;
   a first management area that stores a plurality of access control attributes that correspond with the plurality of extents respectively; and
   a second management area that stores, for each storage device, information on the existence of a write prohibition extent that indicates whether a write prohibition extent, which is an extent that corresponds with an access control attribute signifying write prohibition, is included in the plurality of extents,
   wherein the first management area exists in the storage device that comprises the plurality of extents;
   the second management area exists in at least one of the cache memory area and the control memory area; and
   the at least one computer that reads the at least one computer program:
   judges, when a write request is received from a communication device that transmits write target data and the write request, whether the write prohibition extent exists in a write-destination storage device by accessing the second management area and referencing information on the existence of the write prohibition extent that corresponds with the write-destination storage device according to the write request; and,
   when it is judged that the write prohibition extent exists in the write destination storage device, accesses the first management area that is provided in the write destination storage device, retrieves, from among the plurality of access control attributes, an access control attribute that corresponds with the write-destination extent among a plurality of extents provided in the write destination storage device, judges whether the access control attribute thus retrieved is an access control attribute signifying write prohibition, and controls whether the write target data is written to the write destination extent in accordance with the result of the judgment.

4. The data processing system according to claim 3, wherein the second management area stores, for each storage device, information on the existence of a read prohibition extent that indicates whether a read prohibition extent, which is an extent corresponding with an access control attribute signifying read prohibition, is included in the plurality of extents; and the at least one computer:
judges, when a read request for read target data is received from a communication device that transmits the read request, whether the read prohibition extent exists in a read source storage device by accessing the second management area and referencing information on the existence of a read prohibition extent that corresponds with the read source storage device according to the read request; and,
when it is judged that the read prohibition extent exists in the read source storage device, accesses the first management area that is provided in the read source storage device, retrieves, from among the plurality of access control attributes, an access control attribute that corresponds with a read source extent among a plurality of extents that are provided in the read source storage device, judges whether the access control attribute thus retrieved is an access control attribute signifying read prohibition, and controls whether the read target data is read from the read source extent in accordance with the result of the judgment.

5. The data processing system according to claim 3, wherein the data that is exchanged via the cache memory between the communication device and the storage devices includes:
management information that includes a variety of management information elements for managing the storage device; and
host data constituting data that is read or written by a host computer constituting one of the communication devices; and
the at least one computer preferentially retains, in the cache memory area, a management information element included in the management information among data that is retained in the cache memory area, which is data that is written to the storage device, and erases the host data from the cache memory area first.

6. The data processing system according to claim 3, wherein the storage device comprises a management information storage area for storing a variety of management information items relating to the constitution of the storage device and a host storage area for storing host data, which is data that is read or written by the host computer constituting one of the communication devices;
the control memory area stores, for each storage device, an update status indicating whether the management information storage area is being updated and an update number that is changed when the management information storage area has been updated; and
the at least one computer:
sets a lock indicating that the writing of data to a certain storage device is prohibited when management information is received from a communication device that transmits the management information for storage in the certain storage device;
changes the update status of the certain storage device to an update in progress status indicating that an update is in progress;
writes the received management information to the management information storage area of the certain storage device;
changes the update number corresponding with the certain storage device when the writing of the management information is complete;
changes the update status of the certain storage device to a no update status indicating that there is no update in progress;
references the update status and update number of the certain storage device;
reads management information from the management information storage area of the certain storage device after referencing the update status and update number of the certain storage device;
references the update status and update number of the certain storage device again after reading the management information; and
judges that the management information thus read is valid when neither of the update statuses that are referenced before and after reading the management information are the update in progress status and the update numbers that are referenced before and after reading the management information are both the same number.

7. The data processing system according to claim 3, wherein, of a management information storage area for storing a variety of management information items relating to the constitution of the storage device and a host storage area for storing host data, which is data that is read or written by the host computer constituting one of the communication devices, the storage device comprises at least the host storage area; and,
in the event of compliance with a predetermined condition, the at least one computer prohibits at least one of the establishment of the management information storage area for the certain storage device and the removal of the management information storage area from the certain storage device.

8. The data processing system according to claim 7, wherein the predetermined condition is at least one of the conditions that the certain storage device be connected to the host computer and that at least one extent be established for the certain storage device.

9. The data processing system according to claim 3, wherein another storage device that has the same storage size as the storage device exists;
the storage device comprises a management information storage area for storing a variety of management information items relating to the constitution of the storage device and a host storage area for storing host data, which is data that is read or written by the host computer constituting one of the communication devices;
the other storage device comprises another management information storage area with the same storage capacity as the management information storage area in the same location as the location where the management information storage area of the storage device exists; and the at least one computer copies all the information in the storage device to the other storage device in which the other management information storage area is prepared.

10. The data processing system according to claim 3, wherein another storage device that has the same storage size as the storage device exists;
the storage device comprises a management information storage area for storing a variety of management information items relating to the constitution of the storage device and a host storage area for storing host data, which is data that is read or written by the host computer constituting one of the communication devices;
the other storage device comprises another host storage area but does not comprise another management information storage area; and
the at least one computer:
copies all the information in the storage device to the other storage device in which the other management information storage area is prepared; and
adjusts the address of the other host storage area of the other storage device.

11. The data processing system according to claim 3, wherein another storage device that has the same storage size as the storage device exists;
the storage device comprises a management information storage area for storing a variety of management information items relating to the constitution of the storage device and a host storage area for storing host data, which is data that is read or written by the host computer constituting one of the communication devices; and
the at least one computer prohibits the establishment of information in the storage device for the copy destination when the other storage device conforms to a predetermined condition.

12. The data processing system according to claim 11, wherein the predetermined condition is that at least one extent be established for the other storage device.

13. A data processing method in which there are a plurality of access control attributes each corresponding with a plurality of extents provided in a storage device, the access control attributes corresponding with the extents being access control attributes of a type that is selected from among a plurality of types of access control attributes and in which the plurality of types of access control attributes do not include an access control attribute signifying read prohibition but include an access control attribute signifying write permission, an access control attribute signifying read permission, and an access control attribute signifying write prohibition, comprising the steps of:
receiving a write request from a host computer that transmits write target data and the write request;
retrieving an access control attribute of a write destination extent according to the received write request from among a plurality of access control attributes that each correspond with a plurality of extents provided in the storage device;
judging whether the access control attribute thus retrieved is an access control attribute signifying write prohibition;
controlling whether the write target data is written to the write destination extent in accordance with the result of the judgment;
receiving the read request from a host computer that transmits a read request for read target data; and
reading the read target data from a read source extent without retrieving the access control attribute of the read source extent according to the received read request from among the plurality of access control attributes.

14. The data processing method according to claim 13, wherein the processing of (1) or (2) below is executed in response to a request from the communication device:
(1) processing that renders an area, which includes an area having at least one write target data item that is written to the storage device between a first time and a second time, one extent, and stores the access control attribute for the extent in the attribute storage area;
(2) processing that establishes one extent at a first time, and stores in the attribute storage area an access control attribute for the extent thus set at a second time after write target data has been stored in the extent thus established.

15. A data processing method, where in a plurality of extents provided in at least one storage device of the plurality of storage devices, a cache memory area that temporarily stores data that is exchanged between the storage devices and the communication device, a control memory area that stores information for controlling the exchange of the data, a first management area that stores a plurality of access control attributes that correspond with the plurality of extents respectively, and a second management area that stores, for each storage device, information on the existence of a write prohibition extent that indicates whether a write prohibition extent, which is an extent that corresponds with an access control attribute signifying write prohibition, is included in the plurality of extents, are provided;
the first management area exists in the storage device that comprises the plurality of extents;
the second management area exists in at least one of the cache memory area and the control memory area;
when a write request is received from a communication device that transmits write target data and the write request, a judgment of whether the write prohibition extent exists in a write-destination storage device is performed by accessing the second management area and referencing information on the existence of the write prohibition extent that corresponds with the write-destination storage device according to the write request; and,
when it is judged that the write prohibition extent exists in the write destination storage device, the first management area that is provided in the write destination storage device is accessed, an access control attribute that corresponds with a write-destination extent among a plurality of extents provided in the write destination storage device is retrieved from among the plurality of access control attributes, a judgment of whether the access control attribute thus retrieved is an access control attribute signifying write prohibition is performed, and control of whether the write target data is written to the write destination extent is performed in accordance with the result of the judgment.

* * * * *